United States Patent [19]

Springer et al.

[11] Patent Number: 5,128,455
[45] Date of Patent: Jul. 7, 1992

[54] WATER-SOLUBLE FIBER-REACTIVE DYES, CONTAINING AN AMINO-SUBSTITUTED S-TRIAZINE RING WITH A FIBER-REACTIVE GROUP OF THE VINYLSULFONE SERIES

[75] Inventors: Hartmut Springer, Königstein; Patrick Scheidhauer, Oberursel; Karl-Michael Reichert, Hofheim am Taunus; Güther Schwaiger, Frankfurt am Main; Kurt Hussong, Kelkheim, all of Fed. Rep. of Germany

[73] Assignee: Hoechst Aktiengesellschaft, Frankfurt am Main, Fed. Rep. of Germany

[21] Appl. No.: 454,373

[22] Filed: Dec. 21, 1989

[30] Foreign Application Priority Data

Dec. 23, 1988 [DE] Fed. Rep. of Germany ....... 3843605

[51] Int. Cl.$^5$ .................. C09B 62/503; D06P 1/384
[52] U.S. Cl. .................................. 534/618; 534/617; 534/629; 534/642; 540/126; 544/76; 544/77; 544/189
[58] Field of Search ............... 534/617, 618, 629, 642; 540/126; 544/76, 77, 189; 552/233

[56] References Cited

U.S. PATENT DOCUMENTS 4,933,446 6/1990 Sawamoto et al. ............... 544/76

FOREIGN PATENT DOCUMENTS

| 0076782 | 4/1983 | European Pat. Off. ........... 534/638 |
| 3420467 | 12/1985 | Fed. Rep. of Germany ...... 534/642 |
| 3526551 | 2/1987 | Fed. Rep. of Germany ...... 534/642 |
| 3628090 | 2/1988 | Fed. Rep. of Germany ...... 534/642 |

*Primary Examiner*—Robert W. Ramsuer
*Assistant Examiner*—Fiona T. Powers

[57] ABSTRACT

Water-soluble fiber-reactive dyes which contain one or more groups of the general formula (1)

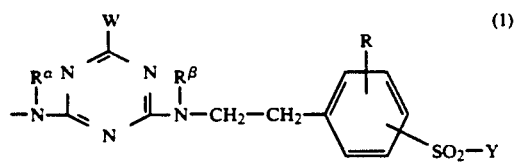

where
$R^a$ and $R^\beta$ are each hydrogen or lower alkyl,
R is hydrogen or sulfo
Y is vinyl or ethyl which is substituted in the β-position by a substituent which is eliminatable under alkaline conditions,
W is hydroxy, N-morpholino, N-piperidinyl, N-pyrrolidinyl or a group of the general formula (2)

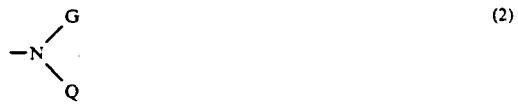

where
G is hydrogen or alkyl of 1 to 6 carbon atoms and
Q is a group of the general formula (2a), (2b), (2c) or (2d)

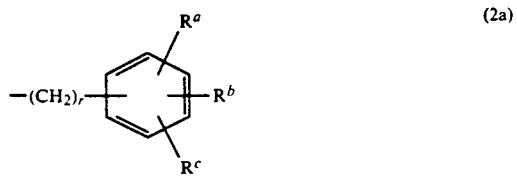

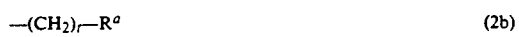

(2b)

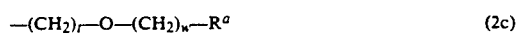

(2c)

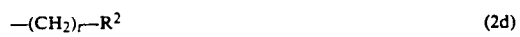

(2d)

where
$R^a$ is a group of the general formula $-SO_2-Y$, where Y is as defined above, or sulfo,
$R^b$ is hydrogen, alkoxy of 1 to 4 carbon atoms, sulfo, hydroxy, carboxy or chlorine,
$R^c$ is hydrogen, alkyl of 1 to 4 carbon atoms or alkoxy of 1 to 4 carbon atoms,
t is from 1 to 6 and
w is from 1 to 6, or
W is a radical of the general formula (2e)

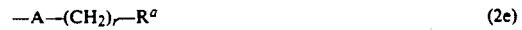

(2e)

where
$R^a$ is as defined above,
r is zero, 1 or 2, and
A is a radical of the general formula

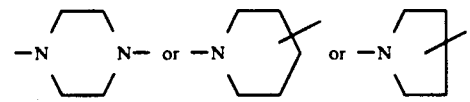

12 Claims, No Drawings

WATER-SOLUBLE FIBER-REACTIVE DYES, CONTAINING AN AMINO-SUBSTITUTED S-TRIAZINE RING WITH A FIBER-REACTIVE GROUP OF THE VINYLSULFONE SERIES

DESCRIPTION

The invention relates to the field of fiber-reactive dyes.

The practice of dyeing with reactive dyes has in recent years led to increased expectations of the quality of the dyeing and the economics of the dyeing process. Consequently, there continues to be a demand for new reactive dyes with improved properties, not only improved fastness properties but also a high degree of fixation on the dyed material. For instance, European Patent Specification No. 0 076 782 B1 discloses fiber-reactive dyes which contain a triazine radical to which two fiber-reactive radicals of the vinyl sulfone series are each attached via an ethyleneamino group. Even so, it is an object of the present invention to provide new, improved reactive dyes which in particular are capable of dyeing cotton in all shades and are highly suitable for use in exhaust methods, in cold pad-batch methods and in printing, and, what is more, are very readily dischargeable.

This object is achieved by the present invention through discovery of water-soluble dyes which contain one or more, such as two or three, groups Z of the general formula (1)

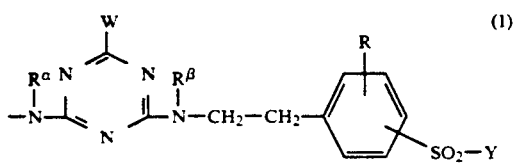

In this formula:

$R^\alpha$ is hydrogen or alkyl of 1 to 4 carbon atoms, such as ethyl, n-propyl or n-butyl, or in particular methyl, but preferably hydrogen, $R^\beta$ is hydrogen or alkyl of 1 to 4 carbon atoms, such as ethyl, n-propyl or n-butyl, or in particular methyl, but preferably hydrogen, R is hydrogen or sulfo, preferably hydrogen, Y is vinyl or a group of the general formula —CH$_2$—CH$_2$—X, in which X is a substituent which is eliminatable as an anion, in particular by means of an alkali, to form a vinyl group, the —SO$_2$—Y group is preferably meta or para to the ethylene group, W is hydroxy, N-morpholino, N-piperidinyl, N-pyrrolidinyl or a group of the generalfformula (2)

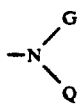   (2)

where

G is hydrogen or alkyl of 1 to 6 carbon atoms, preferably 1 to 4 carbon atoms, such as ethyl, n-propyl or n-butyl or in particular methyl, preferably hydrogen, and Q is a group of the general formula (2a), (2b), (2c) or (2d)

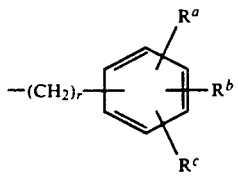   (2a)

—(CH$_2$)$_r$—R$^a$   (2b)

—(CH$_2$)$_r$—O—(CH$_2$)$_w$—R$^a$   (2c)

—(CH$_2$)$_r$—R$^b$   (2d)

where

R$^a$ is a group of the general formula —SO$_2$—Y, where Y is as defined above, or sulfo, R$^b$ is hydrogen, alkoxy of 1 to 4 carbon atoms, such as ethoxy or in particular methoxy, sulfo, hydroxy, carboxy or chlorine, R$^c$ is hydrogen, alkyl of 1 to 4 carbon atoms, such as ethyl or in particular methyl, or alkoxy of 1 to 4 carbon atoms, such as ethoxy or in particular methoxy, t is from 2 to 6, preferably 2 or 3, and w is from 1 to 6, preferably 2 or 3, or W is a radical of the formula (2e)

—A—(CH$_2$)$_r$—R$^a$   (2e)

where

R$^a$ is as defined above, r is zero, 1 or 2, preferably 2, and

A is a radical of the general formula

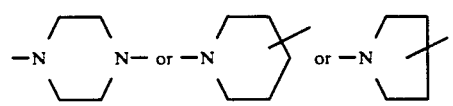

Preferably, W is a radical of the general formula (2f)

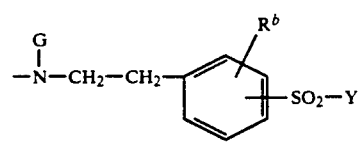   (2f)

where G, R$^b$ and Y are each as defined or in particular preferred herebefore or hereinafter.

Novel dyes which contain one or more groupings of the formula (1) are preferably those of the general formula (3)

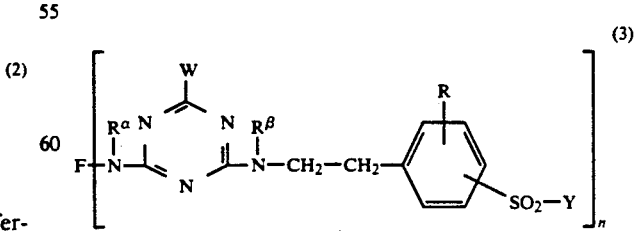   (3)

where:

F is the radical of a sulfo- and/or carboxy-containing dye which may contain a complexed heavy metal ion, such as copper, nickel, cobalt or chromium, for example the radical of a dye of the phthalocyanine, anthraquinone, formazan or azo series, but preferably a sulfo-containing dye of the azo series, in particular the radical of a sulfo-containing monoazo or disazo dye, n is 1 or 2, preferably 1, and R, $R^\alpha$, $R^\beta$, W and Y are each as defined for the formula (1).

Preference is given to dyes of the general formula (3) which contain from 1 to 6 sulfo groups in total. The dye radicals F may further contain customary fiber-reactive groups.

Water-soluble dyes, such as those which contain the radical F, with an amino group —$NHR^\alpha$ from which the dyes which contain groupings of the general formula (1) are derived, have been repeatedly described in the literature, for example in the previously cited European Patent Specification No. 0 076 782, in European Patent Application Publications Nos. 0 070 806A, 070 808A, 0 212 264A, 0 076 782A and 0 144 766A, and also in Venkataraman, The Chemistry of Synthetic Dyes, New York, London, 1972, volume VI, pages 213-297. Particularly useful dyes of this series are water-soluble azo dyes which do not contain any heavy metal, in particular those which contain sulfo and/or carboxy groups, preferably sulfo groups, in particular sulfo-containing monoazo and disazo dyes, and metal complex dyes such as sulfo-containing 1:1 copper complex monoazo and disazo dyes.

Substituents X eliminatable as anions are for example: chlorine, sulfato, thiosulfato, phosphato, alkylsulfonyloxy of 1 to 4 carbon atoms, such as methylsulfonyloxy, alkanoyloxy of 2 to 5 carbon atoms, such as acetyloxy, and sulfobenzoyloxy; of these, sulfato and phosphato, especially sulfato, are preferred.

Important azo dyes conforming to the general formula (3) are those in which F is a radical of a dye of the benzene-azo-naphthol, the benzene-azo-1-phenyl-5-pyrazolone, the benzene-azo-benzene, the naphthalene-azo-benzene, the benzene-azo-aminonaphthalene, the naphthalene-azo-naphthalena, the naphthalene-azo-1-phenyl-5-pyrazolone, the benzene-azo-pyridone or of the naphthalene-azo-pyridone series, of which again the sulfo-containing dyes are preferred.

Such azo dyes of the general formula (3) are for example dyes of the general formulae (4a), (4b) and (4c)

$$Z_n \left[ D-N=N+E-N=N \right]_{\overline{v}} K \quad (4a)$$

$$\left[ \begin{array}{c} \text{HO} \quad NH_2 \\ D-N=N-\phantom{xx}-N=N-D \\ MO_3S \phantom{xxxxx} SO_3M \end{array} \right]-Z_n \quad (4b)$$

$$\left[ \begin{array}{c} Cu \\ O \phantom{x} O \\ | \phantom{x} | \\ D-N=N-K \end{array} \right]-Z_n \quad (4c)$$

in which

D is in each case the radical of a diazo component which in the case of the two D radicals may be identical to or different from the other, E is the bivalent radical of a diazotizable compound capable of coupling, K is the radical of a coupling component, v is zero or 1, Z is a radical of the general formula (1), n is 1 or 2, preferably 1, the radical Z is bonded to D or K or, if n is 2, to both D and K or to both the D radicals, and M is hydrogen or an alkali metal, such as sodium, potassium or lithium.

Aromatic radicals of diazo components D—$NH_2$ of the aniline and aminonaphthalene series which bear no fiber-reactive group Z are for example amines of the general formulae (5a) and (5b)

(5a)

$$R^1 \underset{R^3}{\overset{R^2}{\underset{|}{\diagdown}}} NH_2$$

(5b)

$$R^1 \underset{(SO_3M)_p}{\diagdown} NH_2$$

in which $R^1$ is hydrogen, sulfo or a group of the general formula —$SO_2$—Y, where Y is as defined above, $R^2$ is hydrogen, methyl, ethyl, methoxy, ethoxy, alkanoyl of 2 to 5 carbon atoms, such as acetyl or propionyl, cyano, carboxy, sulfo, alkoxycarbonyl of 2 to 5 carbon atoms, carbamoyl, N—($C_1$-$C_4$-alkyl)carbamoyl, fluorine, chlorine, bromine or trifluoromethyl, $R^3$ is hydrogen, methyl, ethyl, methoxy, ethoxy, cyano, carboxy, sulfo, alkanoylamino of 2 to 5 carbon atoms, such as acetylamino, alkoxycarbonyl of 2 to 5 carbon atoms, carbamoyl, N—($C_1$-$C_4$-alkyl)carbamoyl, fluorine, chlorine, nitro, sulfamoyl, N—($C_1$-$C_4$-alkyl)-sulfamoyl, alkylsulfonyl of 1 to 4 carbon atoms, phenylsulfonyl or phenoxy, p is zero, 1 or 2 (if zero, this group being hydrogen), and M is as defined above, and in which the benzene or naphthalene nucleus may be substituted by hydroxy ortho to —$NH_2$.

Preferably, $R^2$ is hydrogen, methyl, methoxy, bromine, chlorine, carboxy or sulfo and $R^3$ is hydrogen, methyl, methoxy, chlorine, carboxy, sulfo or acetylamino.

The labels "sulfo", "carboxy", "phosphato", "thiosulfato" and "sulfato" include not only the acid form of these substituents but also their salt form. Accordingly, sulfo is a group of the general formula —$SO_3M$, carboxy is a group of the general formula —COOM, phosphato is a group of the general formula —O-$PO_3M_2$, thiosulfato is a group of the general formula —S—$SO_3M$ and sulfato is a group of the general formula —$OSO_3M$, wherein in each case M is as defined above.

Aromatic amines of the general formula D—$NH_2$ conforming to the formulae (5a) and (5b) are for example:

aniline, 2-methoxyaniline, 2-ethoxyaniline, 2-methylaniline, 4-nitro-2-aminoanisole, 4-chloro-2-aminoanisole, 4-methylaniline, 4-methoxyaniline, 2-nitro-4-aminoanisole, 2-methoxy-5-methylaniline, 4-nitroaniline, 2-nitro-4-methylaniline, 2,5-dimethoxyaniline, 2,5-dimethylaniline, 2,4-dimethylaniline, 4-butylaniline, 2,5-diethoxyaniline, 4-cyanoaniline, 2-chloroaniline, 3-chloroaniline, 4-chloroaniline, 4-chloro-2-methylaniline, 3-chloro-2-methylaniline, 4-chloro-2-aminotoluene, 4-(p-tolylsulfonyl)aniline, 1-naphthylamine, 2-naphthylamine, 4-benzoylamino-2-ethoxyaniline, 3-amino-4-methylbenzonitrile, 4-methylsulfonylaniline, 2-trifluoromethylaniline, 3-trifluoromethyl-4-chloroaniline, 2- or 4-aminobenzoic acid, 3-aminobenzoic acid, 3-chloroaniline-6-carboxylic acid, aniline-2-, -3- or -4-sulfonic acid, 2,5-disulfoaniline, 2,4-disulfoaniline, 3,5-disulfoaniline, 2-aminotoluene-4-sulfonic acid, 2-aminoanisole-4-sulfonic acid, 2-aminoanisole-5-sulfonic acid, 4-aminoanisole-2-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3- or -4-sulfonic acid, 3-acetylamino-6-sulfoaniline, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-, -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 4-(β-sulfatoethylsulfonyl)aniline, 3-(β-sulfatoethylsulfonyl)aniline, 2-sulfo-5-(β-sulfatoethylsulfonyl)aniline, 2-sulfo-4-(β-sulfatoethylsulfonyl)aniline, 2-methoxy-4-(β-sulfatoethylsulfonyl)aniline, 2-methoxy-5-methyl-4-(β-sulfatoethylsulfonyl)aniline, 2,5-dimethoxy-4-(β-sulfatoethylsulfonyl)aniline, 2-amino-5-(β-sulfatoethylsulfonyl)phenol, 2-amino-4-(β-sulfatoethylsulfonyl)phenol, 2-amino-6-(β-sulfatoethylsulfonyl)naphthalene-8-sulfonic acid, 2-amino-8-(β-sulfatoethylsulfonyl)naphthalene-6-sulfonic acid, 2-amino-5-(β-sulfatoethylsulfonyl)naphthalene-7-sulfonic acid, 2-amino-7-(β-sulfatoethylsulfonyl)naphthalene-5-sulfonic acid, 2-amino-6-(β-sulfatoethylsulfonyl)naphthalene-1-sulfonic acid, 1-amino-6-(β-sulfatoethylsulfonyl)naphthalene and 1-amino-7-(β-sulfatoethylsulfonyl)naphthalene.

Aromatic amines of the diazo component Z—D—NH$_2$ of the aniline and naphthylamine series with a fiber-reactive radical Z are derived from aromatic amines of the general formulae (6a) and (6b)

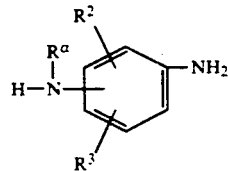

(6a)

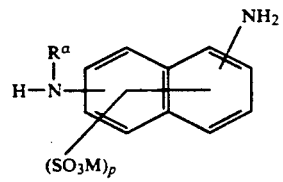

(6b)

where $R^a$, p, $R^2$ and $R^3$ are each as defined, especially preferred, above and where again the benzene or naphthalene nucleus may be substituted by hydroxy ortho to —NH$_2$.

Amines of the general formula (6) are for example: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,5-diamino-4-methylbenzene-2-sulfonic acid, 1,5-diamino-4-methoxybenzene-2-sulfonicacid, 1,3-diaminobenzene-5-sulfonic acid and 1,3-diamino-5-methylbenzene, 1,5-diaminonaphthalene, 8-sulfo-1,3-diaminonaphthalene, 4,8-disulfo-1,6-diaminonaphthalene.

The aromatic amine diazo components may also contain other fiber-reactive groups of the type repeatedly described in the literature, for example in addition to the abovementioned fiber-reactive group of the vinyl sulfone series other reactive groups of the aliphatic series, for example β-bromoacryloylamino, α,β-dibromopropionylamino, β-(phenylsulfonyl)propionylamino, β-(methylsulfonyl)propionylamino, β-chloropropionylamino-2,2,3,3-tetrafluorocyclobutane-1-carbonylamino, N-(β-sulfatoethylsulfonyl)-N-methylamino or -N-ethylamino, or N-(vinylsulfonyl)-N-methylamino or -N-ethylamino, and also fiber-reactive groups of the heterocyclic series, for example of the diazine, triazine, pyridine, pyrimidine, pyridazine, thiazine, oxazine, quinoline, phthalazine or phenanthridine series. Such heterocyclic groups are described for example on pages 9 to 16 of German Offenlegungsschrift No. 3,503,746, which groups are bonded to D via an amino group of the above-defined formula —N($R^a$)—. Heterocyclic fiber-reactive groups are preferably which are substituted by halogen, such as 2,6-difluoro-5-chloropyrimidin-4-ylamino, 2-fluoro-5-chloropyrimidin-4-ylamino, 2-fluoro-5-chloro-6-methylpyrimidin-4-ylamino, 2-fluoro-5,6-dichloropyrimidin-4-ylamino, 6-fluoro-2,5-dichloropyrimidin-4-ylamino or in particular 2-chloro- or 2-fluoro-1,3,5-triazin-6-ylamino groups with the amino radical of the above-defined formula —N($R^a$)—, to which a triazinyl radical may be substituted in the 4-position by low alkoxy or phenoxy or by primary, secondary or tertiary amino whose substituents may be selected from the following groups:

alkyl of 1 to 4 carbon atoms, such as methyl or ethyl, which alkyl may be substituted, for example by sulfo, carboxy, phosphato, sulfato, hydroxy, cyano, a group of the above-defined formula —SO$_2$—Y, phenyl, naphthyl, sulfo- and/or Y—SO₂—substituted naphthyl, sulfo-, carboxy, methyl-, ethyl-, methoxy-, ethoxy-, chlorine-, bromine- or Y—SO₂—substituted phenyl, a cycloaliphatic radical such as cyclohexyl, preferably sulfo-monosubstituted or -disubstituted and/or Y—SO₂-monosubstituted naphthyl, and phenyl which may be substituted by substituents from the group consisting of sulfo, carboxy, chlorine, bromine, methyl, ethyl, methoxy, ethoxy and a group of the above-defined formula —SO₂—Y.

The amino group in the 4-position of the chloro- or fluoro-triazinyl radical can also be the radical of a heterocyclic amine, as of a 5- or 6-membered cyclic amine which may contain a further hetero group, as for example piperidino, piperazino or morpholino. Examples of halotriazinylamino radicals are 2-chloro- or 2-fluoro-4-(2',4'-disulfophenyl)-s-triazin-6-yl, 2-chloro- or 2-fluoro-4-(3'- or 4'-sulfophenyl)amino-S-triazin-6-ylamino and 2-chloro- or 2-fluoro-4-(3'- or 4'-sulfatoethylsulfonylphenyl)amino-s-triazin-6-ylamino.

Aromatic radicals E of a diazotizable compound of the aniline or aminonaphthalene series which is capable of coupling are derived for example from amines of the general formulae (7a) and (7b)

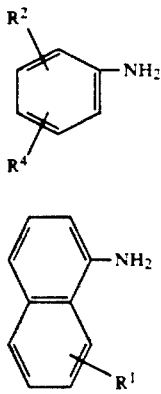

(7a)

(7b)

where

R¹ and R² are each as defined above and

R⁴ is hydrogen, alkyl of 1 to 4 carbon atoms, such as methyl or ethyl, alkoxy of 1 to 4 carbon atoms, such as methoxy or ethoxy, chlorine, alkanoylamino of 2 to 5 carbon atoms, such as acetylamino or propionylamino, benzoylamino, ureido, phenylureido, alkylureido of 1 to 4 carbon atoms in the alkyl moiety, phenylsulfonyl or alkylsulfonyl of 1 to 4 carbon atoms.

Such compounds are for example:

aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1sulfonic acid, 1-aminonaphthalene, 1-aminonaphthalene-6- or -7- or -8-sulfonic acid, 3-acetylaminoaniline, 2-methylaniline,2-methoxyaniline,3-benzoylaminoaniline, 2,3-dimethylaniline, 3,5-dimethylaniline, 1-amino-2-methoxy-5-acetylaminobenzene, 2-chloro-6-methylaniline, 5-chloro-2-methylaniline, 2,6-dichloro-3-methylaniline, 2-methoxy-5-methylaniline, 1-amino-6-(β-sulfatoethylsulfonyl)naphthalene and 1-amino-7-(β-sulfatoethylsulfonyl)naphthalene.

The radicals K of the coupling component preferably come from the aniline, naphthalene, pyrazole or acylacetarylide series; they may have fiber-reactive groups.

Coupling components of the formula H-K of the aniline or naphthalene series are for example the anilines, N-monosubstituted and N,N-disubstituted anilines, m-phenylenediamines and derivatives thereof, naphtholsulfonic acids, aminonaphthalenes, naphthols, hydroxynaphthoic acid derivatives, aminonaphthalenesulfonic acids and aminonaphtholsulfonic acids.

Coupling components of the formula H-K which carry no fiber-reactive group of the general formula (1) are for example compounds of the general formulae (8a), (8b), (8c), (8d) and (8e)

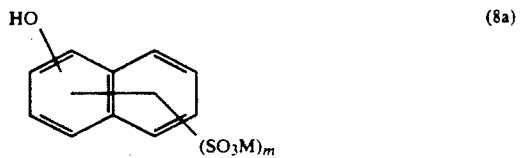

(8a)

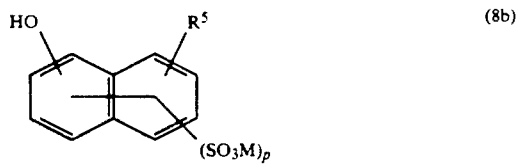

(8b)

(8c)

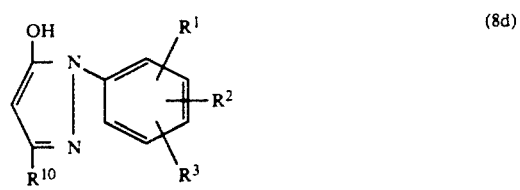

(8d)

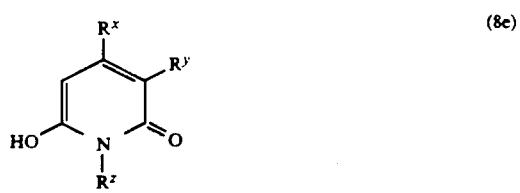

(8e)

where

R¹, R², R³, p and M are each as defined above, m is zero, 1, 2 or 3 (if zero, the group being hydrogen), R⁵ is alkylureido with alkyl of 1 to 6 carbon atoms, phenylureido, phenylureido which is substituted by chlorine, methyl, methoxy, nitro, sulfo and/or carboxy in the phenyl moiety, alkanoylamino of 2 to 7 carbon atoms, for example acetylamino or propionylamino, cyclohexanoylamino, benzoylamino or benzoylamino which is substituted by chlorine, methyl, methoxy, nitro, sulfo and/or carboxy in the benzene moiety, R⁶ is hydrogen, alkyl of 1 to 4 carbon atoms, such as methyl or ethyl, alkoxy of 1 to 4 carbon atoms, such as methoxy or ethoxy, bromine, chlorine or alkanoylamino of 2 to 7 carbon atoms, such as acetylamino or propionylamino, $R^7$ is hydrogen, alkyl of 1 to 4 carbon atoms, such as methyl or ethyl, alkoxy of 1 to 4 carbon atoms, such as methoxy or ethoxy, chlorine or alkanoylamino of 2 to 7 carbon atoms, such as acetylamino or propionylamino, ureido or phenylureido, $R^8$ is hydrogen or alkyl of 1 to 4 carbon atoms which may be substituted by hydroxy, cyano, carboxy, sulfo, sulfato, methoxycarbonyl, ethoxycarbonyl or acetoxy, $R^9$ is alkyl of 1 to 4 carbon atoms which may be substituted by hydroxy, cyano, carboxy, sulfo, sulfato, methoxycarbonyl, ethoxycarbonyl or acetoxy, or is benzyl, phenyl or phenyl which is substituted by alkyl of 1 to 4 carbon atoms, alkoxy of 1 to 4 carbon atoms, chlorine and/or sulfo, $R^{10}$ is hydrogen, alkyl of 1 to 4 carbon atoms, such as methyl, cyano, carboxy, carbalkoxy of 2 to 5 carbon atoms, carboxamido or phenyl, $R^x$ is hydrogen, alkyl of 1 to 4 carbon atoms, such as methyl, or alkyl of 1 to 4 carbon atoms which is substituted by alkoxy of 1 to 4 carbon atoms, such as methoxy, or by cyano, $R^y$ is hydrogen, sulfo, sulfoalkyl with alkylene of 1 to 4 carbon atoms, such as sulfomethyl, cyano or carbamoyl, and $R^z$ is hydrogen or alkyl of 1 to 6 carbon atoms, preferably 1 to 4 carbon atoms, which may be substituted by phenyl, sulfo or sulfophenyl.

Compounds of the general formulae (8) are for example: 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 2-acetylamino-5-hyd-roxynaphthalene-7-sulfonic acid, 3-acetylamino-5-hydroxynaphthalene-7-sulfonic acid, 2-methylamino-8-hydroxynaphthalene-6-sulfonic acid, 2-(3'- or 4'-sulfophenyl-)amino-8-hydroxynaphthalene-6-sulfonic acid, 3-(3'- or 4'-sulfophenyl)amino-8-hydroxynaphthalene-6-sulfonicacid,N,N-di-(β-sulfoethyl)aniline and its methyl-, methoxy- and/or ethoxy-monosubstituted or -disubstituted benzene derivatives, N-ethyl-N-(β-sulfoethyl)aniline, N-(β-sulfoethyl)aniline, N-(β-carboxyethyl)aniline and their methyl-, methoxy- and/or ethoxy-monosubstituted or -disubstituted benzene derivatives, and also 1-[4'-(β-sulfatoethylsulfonyl)-2'-sulfo]phenyl-3-methylpyrazol-5-one, 1-[4'-(β-sulfatoethylsulfonyl)]phenyl-3-carboxypyrazol-5-one and 1-(4'-sulfophenyl)-3-carboxypyrazol-5-one.

Of particular importance are sulfo-containing coupling components which couple in the o- or p-position relative to a hydroxy and/or amino group and which may carry azo groups, such as 1 or 2 azo groups, for example 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid or 1-benzoylamino-8-hydroxynaphthalene-4,6-disulfonic acid.

Suitable coupling components H-K also include in particular: 1-amino-8-hydroxynaphthalene-3,6- or -4,6-disulfonic acid and their arylazo acid-coupling products of the formula (9a)

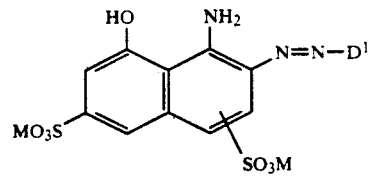

(9a)

where $D^1$ can be the radical of a diazo component, for example a radical of the formula (10a) or (10b)

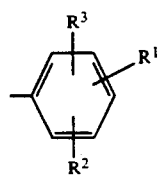

(10a)

or

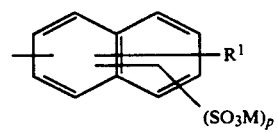

(10b)

where $R^1$, $R^2$, $R^3$, M and p are each as defined above. Individual radicals $D^1$ are for example: phenyl, 2-sulfophenyl, 3-sulfophenyl, 4-sulfophenyl, 2,4-disulfophenyl, 2,5-disulfophenyl, 3,5-disulfophenyl, 1,5-disulfonaphth-2-yl, 4,8-disulfonaphth-2-yl, 3,6,8-trisulfonaphth-2-yl, 4,6,8-trisulfonaphth-2-yl, 3,6,8-trisulfonaphth-1-yl, 4,6,8-trisulfonaphth-1-yl, 4-sulfonaphth-1-yl, 1-sulfonaphth-2-yl, 3-acetylaminophenyl, 4-acetylaminophenyl, 4-acetylamino-2-sulfophen-yl, 5-acetylamino-2-sulfophenyl, 4-nitrophenyl, 4-nitro-2-sulfophenyl, 6-acetylamino-4,8-disulfonaphth-2-yl, 4-(β-sulfatoethylsulfonyl)phenyl and 3-(β-sulfatoethylsulfonyl)phenyl.

Further coupling components H-K without the fiber-reactive group of the formula (1) are for example those of the general formulae (11a), (11b), (11c) and (11d)

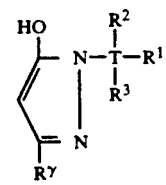

(11a)

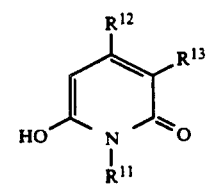

(11b)

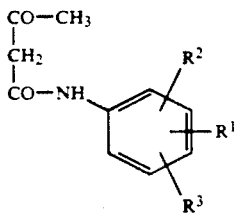

(11c)

or

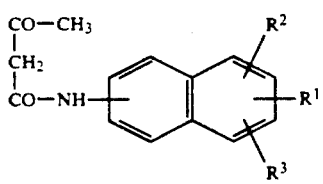

(11d)

where

R$^1$, R$^2$ and R$^3$ are each as defined above,

T is a benzene or naphthalene ring,

R$^7$ is methyl, carboxy, methoxycarbonyl, ethoxycarbonyl or phenyl,

R$^{11}$ is hydrogen, alkyl of 1 to 4 carbon atoms which may be substituted by phenyl, sulfophenyl, hydroxy, amino, methoxy, ethoxy, carboxy, sulfo, acetylamino, benzoylamino or cyano, or is cyclohexyl, phenyl or phenyl which is substituted by carboxy sulfo, benzoylamino, acetylamino, methyl, methoxy, cyano or chlorine, R$^{12}$ is alkyl of 1 to 4 carbon atoms or phenyl and R$^{13}$ is hydrogen, chlorine, bromine, sulfo, carbamoyl, methylsulfonyl, phenylsulfonyl, cyano or sulfomethylene.

Pyrazolone coupling components are for example 3-methyl-, 3-carboxy- and 3-(C$_2$-C$_5$-alkoxycarbonyl)-5-pyrazolones which has in the 1-position hydrogen, phenyl which may be substituted by methyl, ethyl, fluorine, chlorine, bromine, trifluoromethyl, methoxy, ethoxy, cyano, phenoxy, phenylsulfonyl, methylsulfonyl, sulfo, benzoyl, acetyl, acetylamino, nitro, hydroxy, carboxy, carbamoyl and/or sulfamoyl, or sulfo-substituted 1- or 2-naphthyl, for example:

1-phenyl-, 1-(2'-chlorophenyl)-, 1-(2'-methoxyphenyl)-, 1-(2'-methylphenyl)-, 1-(2',5'-dichlorophenyl)-, 1-(2',6'-dichlorophenyl)-, 1-(2'-methyl-6'-chlorophenyl)-, 1-(2'-methoxy-5'-methylphenyl)-, 1-(2'-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)-, 1-(3'-sulfamoylphenyl)-3-carboxy-5-pyrazolone, 1-(3'- or -4'-sulfophenyl)-, 1-(2'-chloro-4'- or -5'-sulfophenyl)-, 1-(2'-methyl-4'-sulfophenyl)-, 1-(4',8'-disulfo-8-naphthyl)-,or 1-(6'-sulfo-1-naphthyl)-3-methyl-5-pyrazolone, ethyl 1-phenyl-5-pyrazolone-3-carboxylate, ethyl 5-pyrazolone-3-carboxylate and 5-pyrazolone-3-carboxylic acid.

Other pyrazole series coupling components are for example 1-methyl-, 1-ethyl-, 1-propyl-, 1-butyl-, 1-cyclohexyl-, 1-benzyl- or 1-phenyl-5-aminopyrazole, 1-(4'-chlorophenyl)- or 1-(4'-methylphenyl)-5-aminopyrazole and 1-phenyl-3-methyl-5-aminopyrazole.

Pyridone coupling components are for example:

1-ethyl-2-hydroxy-4-methyl-5-carboxamido-6-pyridone, 1-(2'-hydroxyethyl)-2-hydroxy-4-methyl-5-carboxamido-6-pyridone, 1-phenyl-2-hydroxy-4-methyl-5-carboxamido-6-pyridone, 1-ethyl-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-methyl-5-cyano-6-pyridone, 1-methyl- 2-hydroxy-5-acetyl-6-pyridone, 1,4-dimethyl-2-hydroxy-5-cyano-6-pyridone, N-($\beta$-sulfoethyl)-4-methyl-5-cyano- or -5-sulfomethyl- or -5-sulfo- or -5-carbamoyl-6-hydroxy-2-pyridone, N-($\beta$-sulfatoethyl)-4-methyl-5-cyano- or -5-sulfomethyl- or -5-sulfo- or -5-carbamoyl-6hydroxy-2-pyridone, N-($\beta$-phosphatoethyl)-, N-($\beta$-sulfoethyl)- or N-($\beta$-sulfatoethyl)-4-methyl-6-hydroxy-2-pyridone, 1,4-dimethyl-2-hydroxy-5-carboxamido-6-pyridone, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethyl-6-pyridone, 1-methyl-2-hydroxy-4-methyl-5-methylsulfonyl-6-pyridone and 1-carboxymethyl-2-hydroxy-4-ethyl-5-phenylsulfonyl-6-pyridone.

Fiber-reactive coupling components of the aniline and naphthalene series which contain a radical of the formula (1) are derived for example from compounds of the general formulae (11e) to (11g)

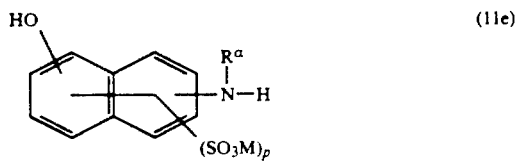

(11e)

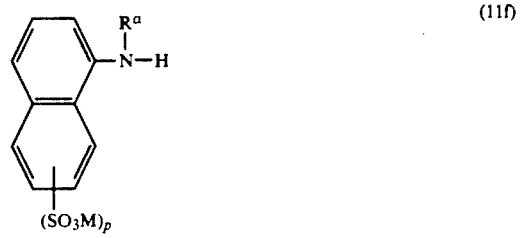

(11f)

(11g)

where R$^a$, R$^2$, R$^3$, M and p are each as defined above.

It is also possible to introduce another fiber-reactive radical by reaction with a fiber-reactive acylating agent prior to the coupling with the diazonium salt in the case of compounds of the general formula (11e) or after coupling with the diazonium salt in the case of compounds of the general formulae (11e) to (11g). It is in principle possible to use for this any known fiber-reactive acylating agent, such as 2,4,6-trifluoro-1,3,5-triazine (cyanuric fluoride) or 2,4,6-trichloro-1,3,5-triazine (cyanuric chloride), or in particular a halotriazinylamino compound of the general formula (26) shown and defined hereinafter. Other known fiber-reactive radicals are the groups previously mentioned as possible fiber-reactive radicals for diazo components, to which may be added 2-chloro-4-bis[$\beta$-($\beta'$-chloroethylsulfonyl)ethyl]-amino-s-triazin-6-ylamino and 3-($\beta$-chloroethylsulfonyl)benzoylamino.

Further coupling components H-K are the arylazo acid-coupling products of 1-amino-8-hydroxynaphthalene-3,6- and -4,6-disulfonic acids of the general formula (9b)

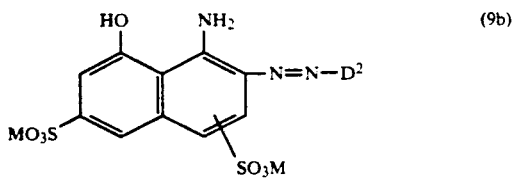

where $D^2$ is the radical of a diazo component having a fiber-reactive group, in particular of the formula (1). $D^2$ is for example a radical of the abovementioned formula (10a) and $R^1$ is a group of the formula $-SO_2-Y$ or a radical of the formula (12)

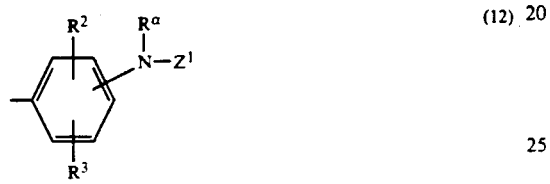

where $R^a$, $R^2$, $R^3$ and M are each as defined above and $Z^1$ is a radical of the general formula (1a)

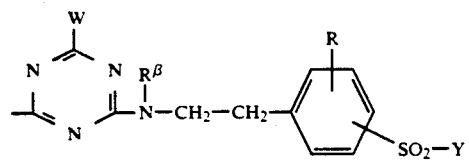

where W, R, $R^\beta$ and Y are each as defined above.

Aromatic diamines which give rise to the radical of the formula (12) are for example:

1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid and 1,5-diamino-4-methoxybenzene-2-sulfonic acid, in each of which the one primary or secondary amino group is substituted by the fiber-reactive radical $Z^1$.

Preferred radicals $D^2$ of the formula (12) are for example radicals of the formulae (12a), (12b), (12c), (12d), (12e) and (12f) where M has the abovementioned meanings:

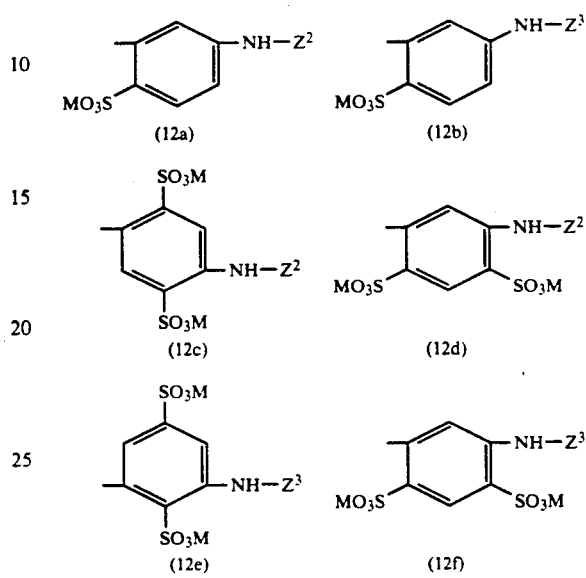

where $Z^2$ is a radical of the formula (1b)

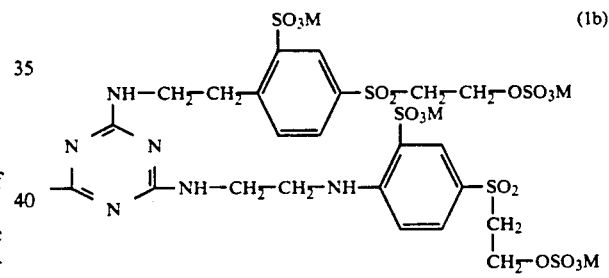

and $Z^3$ is a radical of the formula (1c)

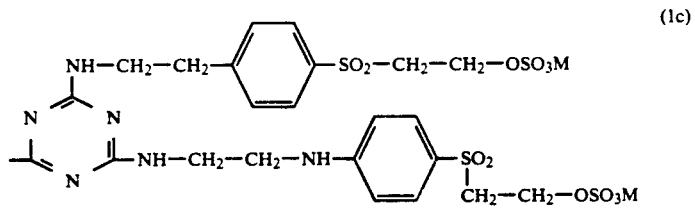

where M is as defined above.

Further preferred radicals $Z^1$ are those conforming to the general formula (1A)

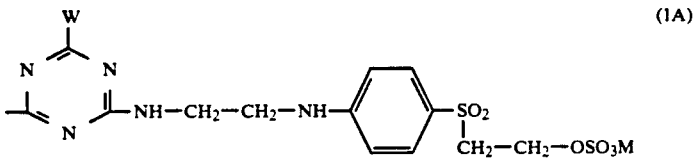

where M is as defined above and W is 3-sulfophenylamino, 4-($\beta$-sulfatoethylsulfonyl)phenylamino, β-sulfoethylamino, N-morpholino, N-piperidinyl, N-pyrrolidinyl, 4-sulfophenylamino or 3-(β-sulfatoethylsulfonyl)phenylamino.

Coupling components which according to the invention contain the fiber-reactive group of the formula (1a) are for example compounds of the general formulae (13a), (13b) and (13c) or their $Z^1$-free intermediates:

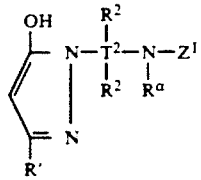
(13a)

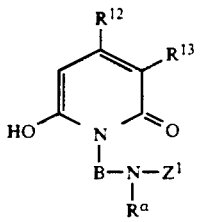
(13b)

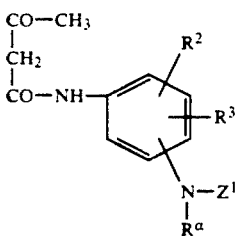
(13c)

where $R^a$, $R^2$, $R^3$, $R^{12}$, $R^{13}$ and $Z^1$ are each as defined above, $T^2$ is a benzene or naphthalene ring, p R' is methyl or carboxy, and B is alkyl of 1 to 4 carbon atoms, benzyl, phenethyl, phenyl, or benzyl, phenethyl or phenyl which are each substituted in the benzene moiety by fluorine, chlorine, bromine, methyl, methoxy, cyano, sulfo, carboxy, acetyl, nitro, carbamoyl and/or sulfamoyl.

Coupling components which correspond to the compounds of the general formulae (13a) to (13c) and which have a hydrogen atom instead of the radical $Z^1$ but into the free amino group of which the radical $Z^1$ can be introduced after the coupling has ended are for example:

1-(3'- or 4'-aminophenyl)-, 1-(2'-sulfo-5'-aminophenyl)- or 1-(2'-methoxy-5'-aminophenyl)-3-carboxy-5-pyrazolone, 1-(3'- or 4'-aminophenyl)- or 1-(3'- or 4'-nitrophenyl)-3-methyl-5-pyrazolone, 1-(3'- or 4'-nitrophenyl)-, 1-(6'-nitro-4',8'-disulfo-2'-naphthyl)- or 1-(6'-amino-4',8'-disulfo-2'-naphthyl)-3-carboxy-5-pyrazolone.

Preferred fiber-reactive coupling components conforming to the formulae (13a) and (13b) are for example compounds of the formulae (14a) to (14g):

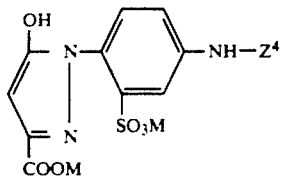
(14a)

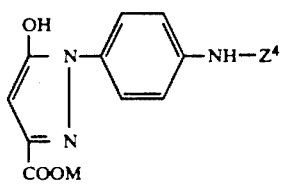
(14b)

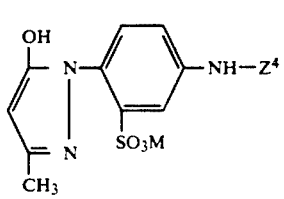
(14c)

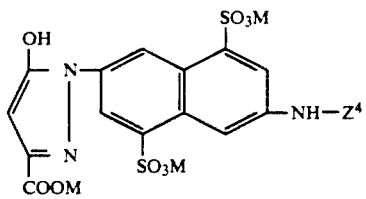
(14d)

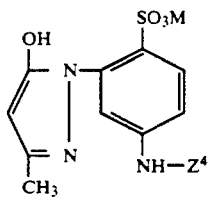
(14e)

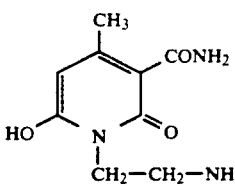
(14f)

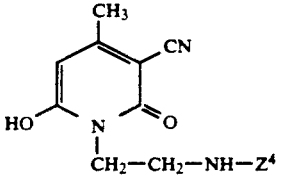
(14g)

where M is as defined above and $Z^4$ has the meanings of $Z^2$ or of $Z^3$.

The azo dyes of the general formula (1) according to the invention can be in particular the monoazo and disazo compounds of the general formulae (15), (16a), (16b), (16c), (16d), (16e), (16f) and (17):

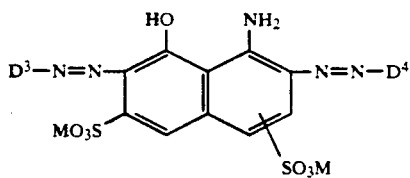
(15)

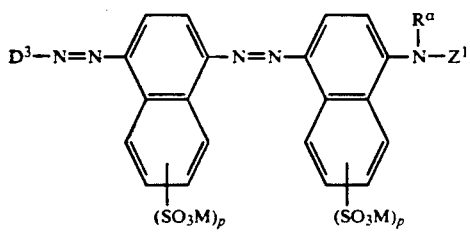
(16a)

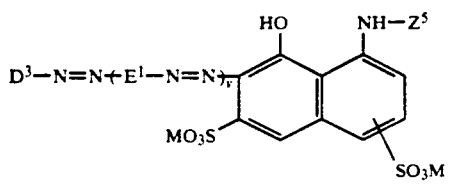
(16b)

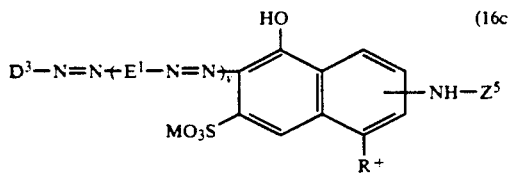
(16c)

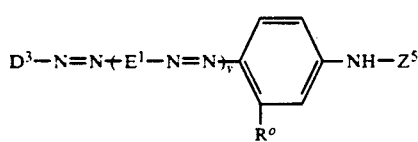
(16d)

(16e)

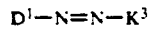
(16f)

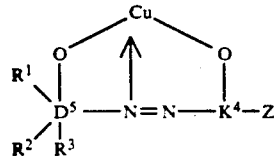
(17)

where the symbols have the following meanings:

In the formula (15), $D^3$ and $D^4$ are identical to or different from each other and each is a radical of a diazo component of which at least one has attached to it a fiber-reactive group of the general formula (1) in which each R″ is hydrogen as is R, this group preferably being in a group $Z^5$ of the general formula (1d)

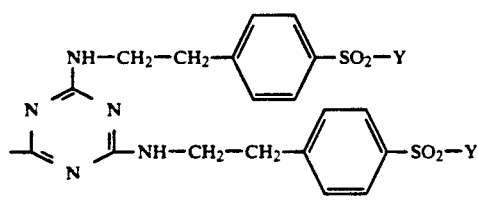
(1d)

where

Y is as defined, in particular preferred, above, $Z^1$ is as defined above or is preferably a group $Z^5$, and M is as defined above;

preferably $D^3$ and $D^4$, which may be identical to or different from each other, are each a radical $D^1$ or $D^2$ conforming to the general formulae (10a) and (10b) or (12) mentioned and defined above, in particular a mono- or disulfophenyl or mono-, di- or trisulfonaphthyl radical or a radical of the formula (12A)

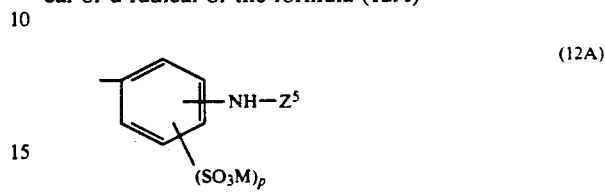
(12A)

where $Z^5$, p and M are each as defined above;

in the formula (16a), $D^3$, p, R and $Z^1$ are each as defined above, R″ preferably being hydrogen and $D^3$ preferably being a radical $D^1$ of the formula (10a) or (10b), especially a monosulfophenyl, disulfophenyl or monosulfonaphthyl, disulfonaphthyl or trisulfonaphthyl radical;

in the formulae (16b), (16c) and (16d), $D^3$, M and v are each as defined above, $D^3$ preferably being a radical $D^1$ of the formula (10a) or (10b), especially a monosulfophenyl, disulfophenyl, monosulfonaphthyl, disulfonaphthyl or trisulfonaphthyl radical, $E^1$ being a radical of the formula (7A)

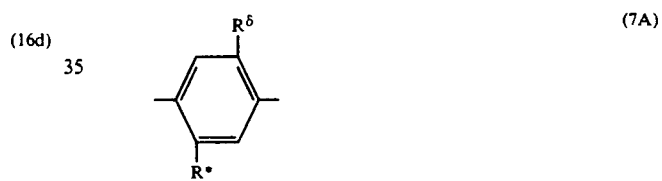
(7A)

where $R^6$ and $R^*$, identical to or different from each other, are each hydrogen, methyl, methoxy or ethoxy, $Z^5$ being as defined above, R being acetylamino or ureido, and R+ being hydrogen or sulfo;

in the formula (16e), $D^2$ is a radical of the abovementioned and above-defined general formula (12), where in the radical $Z^1$ the radical R″ is preferably hydrogen and $Z^1$ is particularly preferably a radical of the general formula (1c), and $K^2$ is a radical of the abovementioned and abovedefined general formula (8a), (8b), (8d) or (8e); in the formula (16f), $D^1$ is a radical of the general formula (10a) or (10b) and $K^3$ is a radical of the general formulae (14a) to (14f);

in the formula (17), $D^5$ is a benzene or naphthalene nucleus, $R^1$, $R^2$ and $R^3$ are each as defined, especially preferred, above, although if $D^5$ is a naphtalene nucleus, then $R^2$ is hydrogen and $R^3$ is hydrogen or a sulfo; the oxy groups on $D^5$ and $K^4$ are ortho to the azo group, $K^4$ is a naphthalene nucleus which may be, preferably is, substituted by 1 or 2 sulfo groups, and Z is the abovementioned fiber-reactive group of the general formula (1a) or preferably a group of the formula —NH—$Z^5$ where $Z^5$ has the meaning of the general formula (1d).

Of the dyes of the general formula (15), the dyes described in Examples 1, 9, 14 and 16 may be singled out; of the dyes of the general formula (16d), those of Examples 52, 71 and 85 may be singled out; and of the dyes of the general formula (16e), those of Examples 122, 123, 129 and 134 may be singled out.

Further interesting dyes conforming to the general formula (3) according to the invention are anthraquinone dyes conforming to the general formula (18)

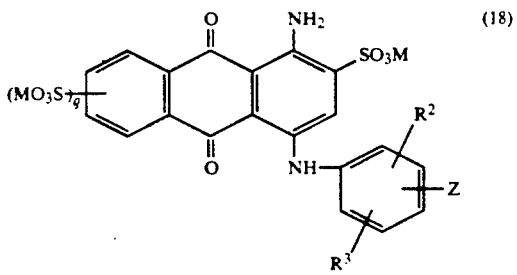

where M and $Z^1$ are each as defined above, q is zero or 1 (if zero, the group being hydrogen), and $R^2$ and $R^3$ are each as preferred above.

The phthalocyanine dyes according to the invention include those of the general formula (19)

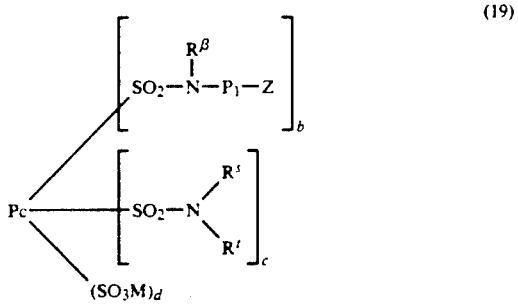

where $R^\beta$, Z and are each as defined above,

Pc is the radical of a metal-free or metal-containing phthalocyanine, for example the radical of cobalt phthalocyanine or preferably of copper phthalocyanine or nickel phthalocyanine, which phthalocyanine radical may be further substituted in the 3- and/or 4-positions of carbocyclic aromatic rings of phthalocyanine, for example by halogen, such as chlorine, or phenyl, and wherein the sulfonamido and/or sulfo groups are attached in the 3- and/or 4-positions of the carbocyclic aromatic rings of the phthalocyanine, $P_1$ is phenylene which may be substituted by substituents from the group consisting of halogen, such as chlorine or bromine, methyl, ethyl, sulfo and carboxy, or alkylene of 2 to 6 carbon atoms, preferably of 2 or 3 carbon atoms, $P_1$ being particularly preferably phenylene which is sulfo-substituted, or 1,2-ethylene, $R^s$ is hydrogen or alkyl of 1 to 4 carbon atoms, such as methyl or n-propyl or preferably ethyl, which may be substituted by sulfo, carboxy, phosphato, hydroxy, sulfato, phenyl, sulfophenyl, $\beta$-sulfatoethylsulfonyl or 3- or 4-($\beta$-sulfatoethylsulfonyl)phenyl, $R^t$ is hydrogen or alkyl of 1 to 4 carbon atoms, such as methyl or n-propyl or preferably ethyl, which may be substituted by sulfo, carboxy, phosphato, hydroxy, sulfato, phenyl, sulfophenyl, $\beta$-sulfatoethylsulfonyl or 3- or 4-($\beta$-sulfatoethylsulfonyl)phenyl, or is phenyl which may be substituted by 1 or 2 substituents from the group consisting of methyl, ethyl, methoxy, ethoxy, chlorine, sulfo, carboxy and $\beta$-sulfatoethylsulfonyl, b is an integer or non-integer from 2 to 4, c is an integer or non-integer from zero to 2, preferably zero, d is an integer or non-integer from zero to 3, preferably from 0.5 to 2.5, and the sum (b+c+d) is an integer or non-integer from 3 to 4.

Formazan dyes of interest according to the invention are those conforming to the general formula (20)

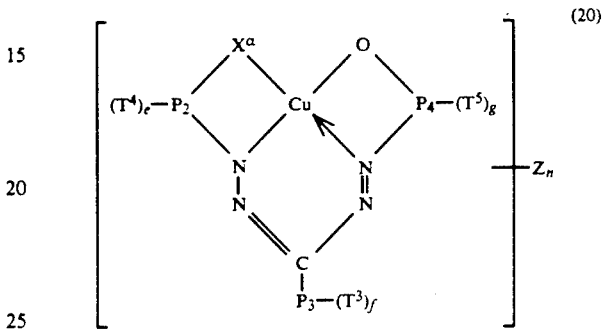

where $X^a$ is oxy, carbonyloxy, or sulfo attached only to $P_2$, $P_2$ and $P_4$ are each independently of the other a benzene or naphthalene ring to which, in the case of $P_2$, the nitrogen atom and the group $X^a$ are attached ortho to each other and, in the case of $P_4$, the oxygen atom and the nitrogen atom are attached ortho to each other and which may be additionally substituted by one or two substituents from the group consisting of halogen, such as chlorine, nitro, alkyl of 1 to 4 carbon atoms, such as methyl or ethyl, alkoxy of 1 to 4 carbon atoms, such as methoxy or ethoxy, sulfamoyl, sulfamoyl which is monosubstituted or disubstituted by alkyl of 1 to 4 carbon atoms, alkylsulfonyl of 1 to 4 carbon atoms, such as methylsulfonyl or ethylsulfonyl, and phenylsulfonyl, $P_3$ is straight-chain or branched alkylene of 2 to 6 carbon atoms, preferably of 2 to 4 carbon atoms, which substituted by sulfophenyl, or is phenylene or naphthylene which may each be substituted, for example by 1 or 2 substituents from the group consisting of methyl, ethyl, methoxy, ethoxy and chlorine, or is a substituted or unsubstituted bivalent heterocyclic radical, $T^3$, $T^4$ and $T^5$ are each independently of the others sulfo or carboxy, preferably sulfo, e, f and g are each independently of the others zero, 1 or 2, the sum (e+f+g) being an integer of from 1 to 4, preferably 2 or 3, in particular 2, where zero e or f or g sets $T^4$ or $T^5$ or $T^3$ respectively to hydrogen, and Z and n are each as defined above, Z may be attached to an aromatic radical of $P_2$, $P_3$ or $P_4$, and n is preferably 1.

Preferred copper formazan compounds of the general formula (20) are those where $P_2$ and $P_4$ are each benzene rings and $T^4$ and $T^5$ are each sulfo, with e and g each being 1 if Z is bonded to $P_4$. If Z is bonded to $P_2$, e is zero, g is 2, $T^5$ is sulfo and $X^a$ is preferably carbonyloxy. Preferably, the benzene and naphthalene nuclei of $P_2$ and $P_4$ in the formula (20) are not substituted, except by $T^4$ and $T^5$.

Triphendioxazine dyes according to the invention are in particular those of the general formula (21)

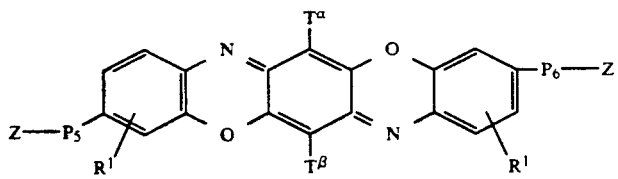

where

Z and R¹ are each as defined above,

P₅ is a direct covalent bond or a radical of the general formula —P$^\alpha$—N(R$^\alpha$)— in which R$^\alpha$ is as defined above and P$^\alpha$ is a benzene ring which may be substituted by 1 or 2 substituents from the group consisting of methyl, ethyl, methoxy, ethoxy, chlorine, sulfo and carboxy, preferably sulfo, or is cycloalkylene, such as cyclohexylene, or is straight-chain or branched alkylene of 2 to 6, preferably 2 to 4, carbon atoms which may be substituted by sulfo, sulfato, phosphato or carboxy or by a sulfophenyl, or is alkylene of 2 to 8 carbon atoms which may be interrupted by hetero groups, such as 1 or 2 hetero groups of the formulae —O—, —SO₂—, —CO—, —NH— and —N(R$^\alpha$)— where R$^\alpha$ is as defined above, P₆ is a covalent bond or a group of the general formula —N(R$^\alpha$)—P$^\alpha$— where R$^\alpha$ and P$^\alpha$ are each as defined above, and T$^\alpha$ and T$^\beta$ are each independently of the other, but preferably identical to the other, hydrogen, fluorine, chlorine, bromine, alkyl of 1 to 4 carbon atoms, alkoxy of 1 to 4 carbon atoms, aryloxy, such as phenoxy, alkanoylamino of 2 to 5 carbon atoms, such as acetylamino, benzoylamino, phenylcarbonylamino, carbamoyl or carbamoyl which is monosubstituted or disubstituted by alkyl of 1 to 4 carbon atoms, benzyl and/or phenyl, or preferably chlorine.

The dyes according to the invention can be prepared in in a conventional manner, for example by converting the dye intermediates familiar to the person skilled in the art for the particular class of dye by the methods of synthesis customary for this class of dye, at least one of the dye intermediates containing a fiber-reactive group of the general formula (1). For instance, monoazo and disazo dyes conforming to the general formula (3) can be synthesized by reacting their diazo and coupling components, which each or both contain a fiber-reactive group of the general formula (1), by the usual method of diazotization and coupling. If disazo dyes are to be synthesized, the diazo or coupling component may already contain the second azo group. Diazo components usable according to the invention are the aromatic carbocyclic and heterocyclic amino compounds which are customary for fiber-reactive azo dyes and which may contain the fiber-reactive group of the general formula (1), and the coupling components customary for the synthesis of fiber-reactive azo dyes, for example of the naphthol, aniline, naphthylamine, aminonaphthol, pyrazolone and pyridone series, which may each contain the fiber-reactive group of the general formula (1). Such diazo and coupling components are for example the compounds conforming to the general formulae (5), (6), (7), (8), (9), (10), (11), (13) and (14) described at the beginning.

The diazotization and coupling reactions are carried out in a conventional manner; for instance the diazotization in general at a temperature between −5° C. and +15° C. and at a pH below 2 by means of a strong acid and an alkali metal nitrite in a preferably aqueous medium and the coupling reaction in general at a pH between 1.5 and 4.5 in the case of an amino-containing coupling component and at a pH between 3 and 7.5 in the case of a hydroxy-containing coupling component and at a temperature of between 0° and 25° C., again preferably in an aqueous medium.

The dyes according to the invention, such as those of the general formula (3), can likewise be prepared according to the invention by reacting a cyanuric halide, such as cyanuric fluoride or in particular cyanuric chloride, or a dihalotriazine compound of the general formula (22)

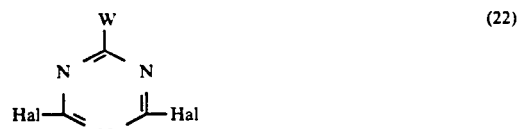
(22)

where Hal is halogen, such as fluorine or chlorine, and W is as defined above, with a water-soluble dye which contains one or more amino groups of the formula —NHR$^\alpha$, where R$^\alpha$ is as defined above, such as with a compound of the general formula (23)

(23)

where F, R$^\alpha$ and n are each as defined above, and an amino compound of the general formula (24)

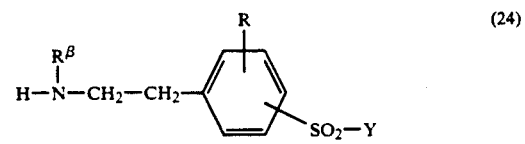
(24)

where R, R$^\beta$ and Y are each as defined above, and with or without an amine of the general formula H-W¹, where W¹ is a radical of the general formulae (2a) to (2e) of the abovementioned meaning, in any desired order. For instance, first an amino compound of the general formula (23) can be reacted with a cyanuric halide, such as cyanuric chloride or cyanuric fluoride, preferably cyanuric chloride, to give a dihalotriazinylamino compound of the general formula (25)

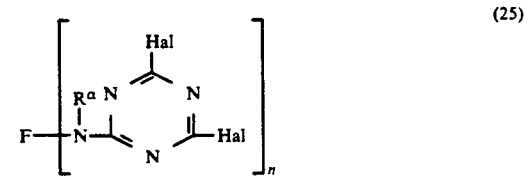
(25)

where Hal, F, $R^\alpha$ and n are each as defined above, and this product is converted by reaction with an amino compound of the general formula (24) and with or without an amine of the formula $H\text{-}W^1$ of the above meaning in an equivalent amount into the final dye (3), or first an amino compound of the general formula (24) is reacted with a cyanuric halide to give a dihalotriazinylamino compound of the general formula (26)

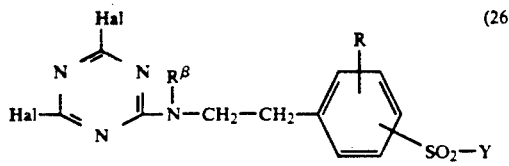

where Hal, $R^\beta$ and Y are each as defined above, and this product is converted in an equivalent amount with the compound of the general formula (23) to the final dye (3), or an amino compound of the general formula (23) is reacted with a halotriazine compound of the general formula (27)

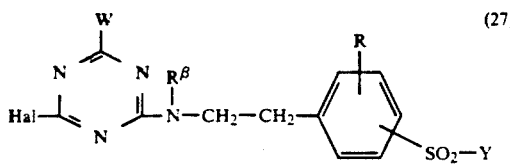

where Hal, W, $R^\beta$, R and Y are each as defined above, or a compound of the general formula (28)

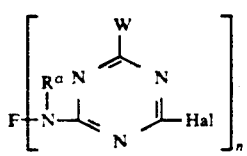

where F, $R^\alpha$, W and Hal are each as defined above, is reacted with an amine of the formula (24).

The condensation reactions between the cyanuric halide or the halotriazinylamino compounds and the appropriate amino compounds can be carried out in the usual manner of the reaction of cyanuric halide or halotriazinylamino compound with an amino compound, for instance in an organic or preferably aqueous organic medium, particularly preferably in an aqueous medium in the presence of an acid-binding agent, such as an alkali metal or alkaline earth metal carbonate, an alkali metal or alkaline earth metal bicarbonate or hydroxide or an alkali metal acetate, the alkali and alkaline earth metals preferably being sodium, potassium or calcium. Acid-binding agents also include tertiary amines, for example pyridine, triethylamine or quinoline. If these condensation reactions are carried out in an organic or aqueous organic medium, the organic solvent (content) is acetone, dioxane or dimethylformamide.

The condensation reactions between the cyanuric halide, preferably cyanuric chloride, and the amino compounds generally take place at a temperature between $-10°$ C. and $+40°$ C., preferably between $-5°$ C. and $+30°$ C., and at a pH between 4.5 and 8.0, preferably between 5 and 7. The reaction of the halotriazinylamino compounds with an amino compound of the general formula (23) or (24) or $H\text{-}W^1$ is carried out for example at a temperature of between $-10°$ C. and $+60°$ C., preferably between $0°$ and $5°$ C., and at a pH between 3 and 8, preferably between 4 and 7.5, although care must be taken to ensure that the fiber-reactive group is not damaged in the weakly alkaline range.

Those dyes according to the invention where $-SO_2-Y$ is $\beta$-sulfatoethylsulfonyl or $\beta$-phosphatoethylsulfonyl can also be prepared according to the invention by reacting a dye of the same structure except that $-SO_2-Y$ is $\beta$-hydroxyethylsulfonyl in a known manner with a sulfating agent or phosphating agent, such as concentrated sulfuric acid, $SO_3$-containing sulfuric acid, amidosulfuric acid, mixtures of phosphorus pentoxide and phosphoric acid and aqueous concentrated phosphoric acid, the sulfation generally taking place at a temperature between $10°$ C. and $25°$ C. and the phosphation at a temperature between $5°$ and $30°$ C.

The starting dyes which contain one or more $\beta$-hydroxyethylsulfonyl groups are synthesizable similarly to the above directions for the preparation of the dye according to the invention by either using corresponding dye intermediates which contain this or these $\beta$-hydroxyethylsulfonyl groups or reacting an amino dye of the general formula (23) and an amino compound of the general formula (24) and optionally an amino compound of the general formula $H\text{-}W^1$ of the above meaning, in each of which however Y is $\beta$-hydroxyethyl, with a cyanuric halide under the above reaction conditions. In the latter case, in which the starting compound (24) or its halotriazinyl derivatives (26) and (27) contain $\beta$-hydroxyethylsulfonyl group(s) as $-SO_2-Y$, the condensation reaction can also be carried out at a more strongly alkaline pH, for example at a pH between 8 and 10.

In the synthesis of heavy metal complexed azo dyes according to the invention, for example those conforming to the general formulae (4c) and (17), the starting materials are in general those azo compounds free of heavy metal which contain in the coupling component an attached phenolic or naphtholic hydroxy group ortho or vicinally to the azo group and whose diazo component radical contains attached ortho to the azo group a hydrogen atom or a hydroxy group or a lower alkoxy group, such as a methoxy group, and which in addition contain an attached acylamino radical, such as an acetylamino radical conforming to the general formula $-N(R^\alpha)-$acyl, where acyl is the acyl radical of an organic acid, such as a lower alkanecarboxylic acid, and $R^\alpha$ is as defined above, for example the materials of the starting compound conforming to the general formula (29)

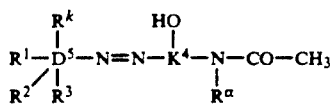

where $R^1$, $R^2$, $R^3$, $D^5$, $K^4$ and $R^\alpha$ are each as defined above and $R^k$ is hydrogen or a hydroxy or methoxy group attached to $D^5$ ortho to the azo group, and this acylamino-containing starting azo compound is reacted by known and customary methods with a heavy metal donor, such as a heavy metal salt, or else, if a copper complex azo dye is to be formed, is subjected to a conventional oxidative or dealkylating coppering reaction. The resulting acylamino-containing heavy metal complex azo compounds can then be reacted by known methods, with hydrolysis of the acylamino group to an amino group, with a cyanuric halide and a fiber-reactive amino compound conforming to the general formula (24) to give the dyes of the general formula (3) according to the invention.

The anthraquinone dyes conforming to the general formula (18) according to the invention are in general prepared according to the invention for example by reacting a compound of the general formula (30)

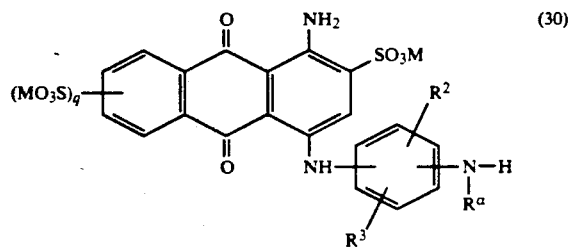

where M, q, $R^2$, $R^3$ and $R^a$ are each as defined above, with cyanuric chloride and with an amine of the general formula (24) under the conditions mentioned at the beginning. The starting compounds of the general formula (30) have been repeatedly described in the literature, and compounds which have not been described can be prepared in a similar manner, for example by reacting 1-amino-2-sulfo-4-bromoanthraquinone or its additionally sulfonated product with a diamino compound or its monoacylamino derivative conforming to the general formula (31)

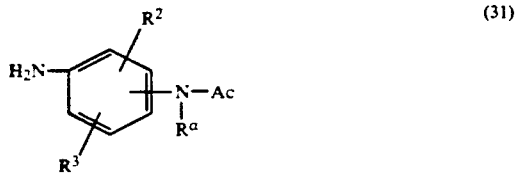

where $R^2$, $R^3$ and $R^a$ are each as defined above, and Ac is hydrogen or acyl of the abovementioned meaning, any acyl group present after the condensation reaction being hydrolytically eliminatable in a conventional manner. Such procedures are described for example in U.S. Pat. No. 4,088,441.

Diamines conforming to the general formula (31) where Ac is hydrogen are for example 1,4-diaminobenzenesulfonic acid, 2,4-diaminotoluene-6-sulfonic acid, 2,6-diaminotoluene-4-sulfonic acid, 3,5-diamino-2,4,6-trimethylbenzenesulfonic acid, 1,4-phenylenediamine, 2,5-diaminobenzenecarboxylic acid, 2,5-diaminobenzenesulfonic acid and 2,4-diaminobenzenecarboxylic acid.

The phthalocyanine dyes conforming to the general formula (19) according to the invention are prepared in general by condensing a phthalocyaninesulfonyl chloride of the general formula (32)

where Pc is as defined above, h is an integer or noninteger from zero to 2, and j is an integer or noninteger from 2 to 4, the sum (h+j) being equal to an integer or noninteger from 2 to 4, with an amino compound of the general formula $HNR^\beta P_1$-Z, where $R^\beta$, $P_1$ and Z are each as defined above, and with or without an amino compound of the general formula $H_2NR^sR^t$, where $R^s$ and $R^t$ are each as defined under the formula (19), with simultaneous or subsequent hydrolysis of sulfonyl chloride groups to sulfo groups. Such procedures for reacting phthalocyaninesulfonyl chloride compounds and amino compounds with or without an additional hydrolysis of sulfonyl chloride groups to sulfo groups have been repeatedly described in the literature, for example in U.S. Pat. No. 4,745,187 and the references cited therein; the phthalocyanine dyes of the formula (19) according to the invention can be prepared in a similar manner. The dyes of the formula (19) can also be prepared according to the invention under conditions customary for the reaction of phthalocyaninesulfonyl chlorides or dihalotriazinylamino compounds with amino compounds by reacting a compound of the general formula (33)

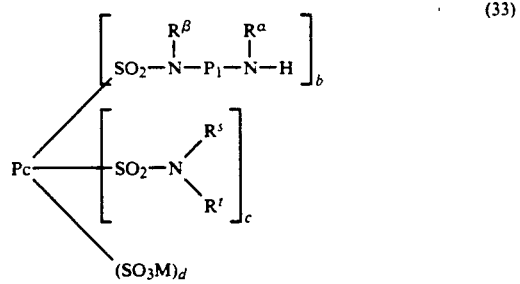

where Pc, M, $R^\beta$, $P_1$, $R^a$, $R^s$, $R^t$, b, c and d are each as defined under the formula (19), with a cyanuric halide and with an amino compound of the general formula (24) as described at the beginning. The starting compounds of the general formula (33) can themselves be synthesized prepared in a conventional manner by reacting a phthalocyaninesulfonyl chloride conforming to the general formula (32) with an amino compound of the general formula $HN(R^\beta)$-$P_1$-$NH(R^a)$, where $R^a$, $R^\beta$ and $P_1$ are each as defined above.

Starting compounds conforming to the general formula $NH(R^\beta)$-$P_1$-$NH(R^a)$ are for example 1,3-phenylenediamine, 1,4-phenylenediamine, 2,4-diaminobenzenesulfonic acid, 2,5-diaminobenzenesulfonic acid, 2,5-diaminobenzenecarboxylic acid, 2,5-diaminobenzene-1,4-disulfonic acid, 2,4-diaminotoluene-6-sulfonic acid, ethylenediamine and hexamethylenediamine. Examples of starting dyes conforming to the general formula (33) are for example 3-[N-(3-amino-4-sulfophenyl)sulfamoyl](copper phthalocyanine)-3',3'',3'''-trisulfonic acid, bis-4,4''-[N-(3-amino-4-sulfophenyl)sulfamoyl](copper phthalocyanine)-4'',4'''-disulfonic acid, 3-[N-(4-amino-3-sulfophenyl)sulfamoyl](nickel phthalocyanine)-3',3'',3'''-trisulfonic acid, 3-[N-(3-aminophenyl)sulfamoyl]-3'-sulfamoyl(copper phthalocyanine)-3'',3'''-disulfonic acid and 3-(N-$\beta$-aminoethylsulfamoyl)-(copper phthalocyanine)-3',3'',3'''-trisulfonic acid.

The formazan dyes conforming to the general formula (20) according to the invention are preparable according to the invention by the method described at the beginning by reacting the corresponding aminoformazan starting compound conforming to the general formula (34)

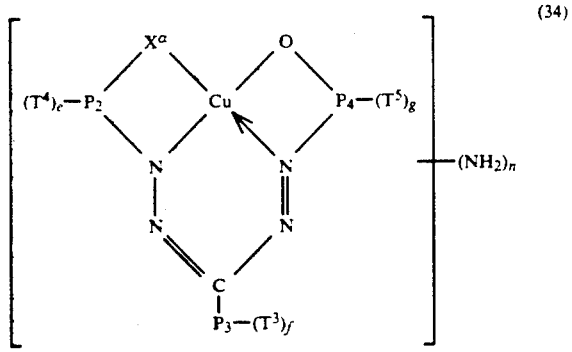

(34)

where the individual symbols are each as defined for the formula (20) and the (two) amino(s) are bonded to $P_2$, $P_4$ and/or $P_3$ in the manner of the radical Z, with a cyanuric halide and an amino compound of the general formula (24).

The starting compounds of the general formula (34) have been described in the literature.

In the same way, the triphendioxazine dyes of the general formula (21) according to the invention are synthesized according to the invention by reacting an amino-containing triphendioxazine compound conforming to the general formula (35)

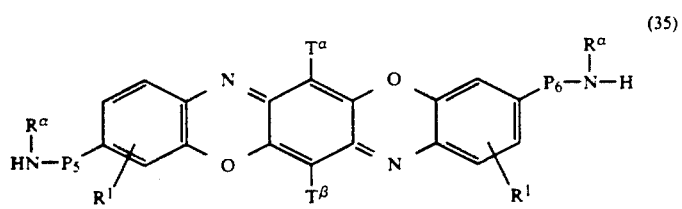

(35)

where the individual symbols are each as defined for the formula (21), with a cyanuric halide and an amine of the general formula (24). The starting compounds of the formula (35) are obtainable similarly to known procedures, as described for example in German Offenlegungsschriften Nos. 2,122,262, 2,124,080, 2,302,382, 2,344,781, 2,503,611, 2,823,828 and 3,426,727 and in British Patent No. 2,019,872, by reaction of benzoquinone as described in the abovementioned specifications, in particular in German Offenlegungsschrift No. 3,426,727, preferably 2,3,5,6-tetrachloro-1,4-benzoquinone, with an amino compound conforming to the general formula (36)

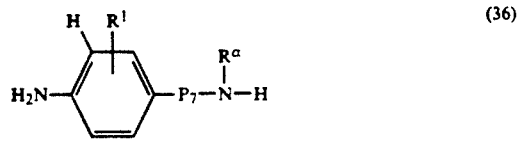

(36)

where $R^1$ and $R^\alpha$ are each as defined above and $P_7$ has one of the meanings of $P_5$ and $P_6$, preferably by performing the ring closure to the triphendioxazine structure in concentrated sulfuric acid or in particular $SO_3$-containing sulfuric acid as reaction medium at a temperature between 10° and 80° C., preferably between 10° and 25° C., in the presence or absence of an oxidizing agent, such as potassium peroxodisulfate, ammonium peroxodisulfate, organic peroxides, hydrogen peroxide or iodine.

The starting amino compounds of the general formula (24) are known, for example from previously cited German Offenlegungsschrift No. 3,426,727 and also from German Offenlegungsschrift No. 3,404,855.

The dyes according to the invention, in particular those conforming to the general formula (3), are suitable for use as fiber-reactive dyes for dyeing and printing hydroxy-containing fibers, in particular cotton, but also synthetic or natural polyamide fibers such as wool. Suitable dyeing methods are the known dyeing and printing methods for fiber-reactive dyes, in particular those for fiber-reactive dyes which possess a combination of fiber-reactive groups of the fluorotriazine and vinyl sulfone series. Such methods have been repeatedly described in the general literature and in the patent literature, for example in European Patent Application Publication No. 0 196 536A1. In particular, the dyes according to the invention can be applied with advantage by the exhaust method at 40° to 80° C. and by the cold pad-batch method. Application is possible over a wide temperature range, and the dyes are notable for good depth of colour and a high degree of fixation; the dyeings and prints prepared therefrom have high fastness properties.

The Examples which follow serve to illustrate the invention. Parts and percentages are by weight, unless otherwise stated. Parts by weight bear the same relation to parts by volume as the kilogram to the liter.

The compounds described in the Examples by means of formulae are shown in the form of the free acids; in general, they are prepared and isolated in the form of their sodium or potassium salts and used for dyeing in the form of their salts. It is similarly possible to use the free acid starting compounds and components mentioned in the examples which follow, in particular the Table Examples, in the synthesis in that free acid form or in the form of their salts, preferably alkali metal salts.

The absorption maxima ($\lambda_{max}$) in the visible region reported for the compounds according to the invention were determined on aqueous solutions of their alkali metal salts. In the Table Examples, the $\lambda_{max}$ values are given in brackets next to the hue; the wavelength is given in nm.

EXAMPLE 1

An aqueous suspension of 31.9 parts of 1-amino-3,6-disulfo-8-naphthol is introduced at 5° C. into an aqueous hydrochloric acid solution of the diazonium salt of 17.3 parts of aniline-4-sulfonic acid, and coupling is carried out at a pH between 1 and 2. The aqueous hydrochloric acid suspension of the diazonium salt of a condensation product obtained by reaction of 18.8 parts of 1,3-phenylenediamine-4-sulfonic acid with 18.4 parts of cyanuric chloride at a pH of 2.5 and a temperature of 10° C. is then added. The second coupling reaction is carried out at a pH between 5 and 6. A solution of 45.8 parts of 4-($\beta$-hydroxyethylsulfonyl)-1-($\beta$-aminoethyl)-benzene is then added, and the condensation reaction is completed at a pH between 9 and 9.5 and a temperature of 80° C. The batch is then cooled down and neutralized, and the resulting azo compound according to the invention is salted out with sodium chloride.

It is filtered off with suction, dried and then esterified with sulfuric acid at 20° to 25° C. The batch is discharged onto ice, the precipitated compound is filtered off with suction and again taken up in water, the solution is adjusted to pH 5 with sodium bicarbonate, and the compound is again salted out with sodium chloride and isolated in a conventional manner.

The result obtained is a black electrolyte-containing powder of the alkali metal salt of the compound of the formula

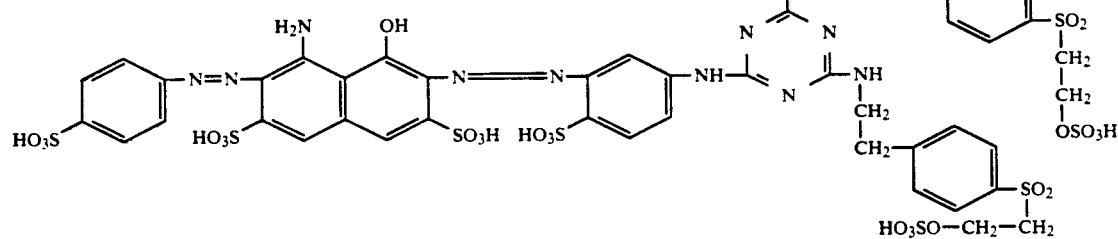

($\lambda_{max}$ = 594 nm)

which has very good fiber-reactive dye properties and dyes for example cotton by the dyeing and printing methods customary for fiber-reactive dyes in fast navy shades.

EXAMPLES 2 TO 15

Table Examples 2 to 15 below describe further novel disazo compounds conforming to a general formula (A)

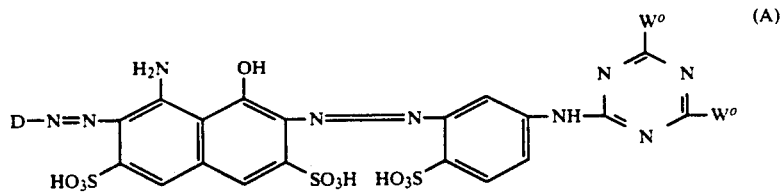

where $W^o$ is the radical of the amino compound of the formula (24), with the aid of the indicated components. They can be prepared in a manner according to the invention, for example as described in Working Example 1, using the acid-coupled diazo component D-HN$_2$, 1-amino-8-naphthol-3,6-disulfonic acid as bivalent coupling component, 1,3-phenylenediamine-4-sulfonic acid, cyanuric chloride and the amine of the general formula (24). These novel compounds conforming to the general formula (3) likewise have very good fiber-reactive dye properties and dye in particular cellulose fiber materials in the deep fast shades indicated for the particular Table Example.

| Ex. | Diazo component D-NH$_2$ | Amine H—W' | Hue |
|---|---|---|---|
| 2 | 2-chloro-4-sulfoaniline | 4-(β-sulfatoethylsulfonyl)-1-(β-aminoethyl)benzene | navy |
| 3 | 2-chloro-4,6-disulfoaniline | 4-(β-methylsulfonyloxyethylsulfonyl)-2-sulfo-1-(β-aminoethyl)benzene | reddish navy |
| 4 | 4-chloro-2-sulfoaniline | 4-(β-phosphatoethylsulfonyl)-1-(β-aminoethyl)benzene | reddish navy |
| 5 | 1,5-disulfo-2-naphthylamine | 4-(β-sulfatoethylsulfonyl)-2-sulfo-1-(β-aminoethyl)benzene | greenish navy |
| 6 | 4-ethylsulfonylaniline | 4-(β-sulfatoethylsulfonyl)-1-(β-ethylamino)benzene | reddish navy |
| 7 | 2-methyl-4,6-disulfoaniline | 4-(β-methylsulfonyloxyethylsulfonyl)-2-sulfo-1-(β-aminoethyl)benzene | reddish navy |
| 8 | 3,6,8-trisulfo-2-naphthylamine | 4-(β-sulfatoethylsulfonyl)-1-(β-aminoethyl)benzene | greenish navy |
| 9 | 4-(β-sulfatoethylsulfonyl)-aniline | 4-(β-sulfatoethylsulfonyl)-1-(β-aminoethyl)benzene | reddish navy |
| 10 | 2-sulfoaniline | 4-(β-sulfatoethylsulfonyl)-1-(β-aminoethyl)benzene | reddish navy |
| 11 | 3-[2'-chloro-4'-(3''-sulfophenylamino)-s-triazin-6'-yl]amino-6-sulfoaniline | 4-(β-sulfatoethylsulfonyl)-2-sulfo-1-(β-aminoethyl)benzene | reddish navy |
| 12 | 3-[2'-chloro-4'-(4''-β-sulfatoethylsulfonylphenylamino)-s-triazin-6'-yl]-amino-6-sulfoaniline | 4-(β-sulfatoethylsulfonyl)-1-(β-aminoethyl)benzene | reddish navy |

-continued

| Ex | Diazo component D-NH₂ | Amine H—W" | Hue |
|---|---|---|---|
| 13 | aniline | 4-(β-sulfatoethylsulfonyl)-1-(β-aminoethyl)benzene | reddish navy |
| 13a | 3-(β-sulfatoethylsulfonyl)-aniline | 4-(β-sulfatoethylsulfonyl)-1-(β-aminoethyl)benzene | reddish navy |
| 14 | 2-sulfo-4-(β-sulfatoethylsulfonyl)aniline | 4-(β-sulfatoethylsulfonyl)-1-(β-aminoethyl)benzene | reddish navy |
| 15 | 5-sulfo-3-(β-sulfatoethylsulfonyl)aniline | 4-(β-sulfatoethylsulfonyl)-1-(β-aminoethyl)benzene | reddish navy |

EXAMPLE 16

81.4 parts of the tertiary condensation product of 1,3-phenylenediamine-4-sulfonic acid, cyanuric chloride and 4-(β-sulfatoethylsulfonyl)-1-(β-aminoethyl)-benzene are diazotized in a conventional manner in hydrochloric acid solution and then added to a suspension of 30.8 parts of 1-amino-8-naphthol-3,6-disulfonic acid in 300 parts of water for acid coupling. The red monoazo compound thus prepared is subsequently admixed with 17.3 parts of the hydrochloric acid diazotization product of aniline-4-sulfonic acid, the batch is neutralized, and the coupling reaction to give the disazo dye is completed in the neutral region. The compound according to the invention is precipitated with potassium chloride. Drying leaves a black electrolyte-containing powder of the alkali metal salt of formula

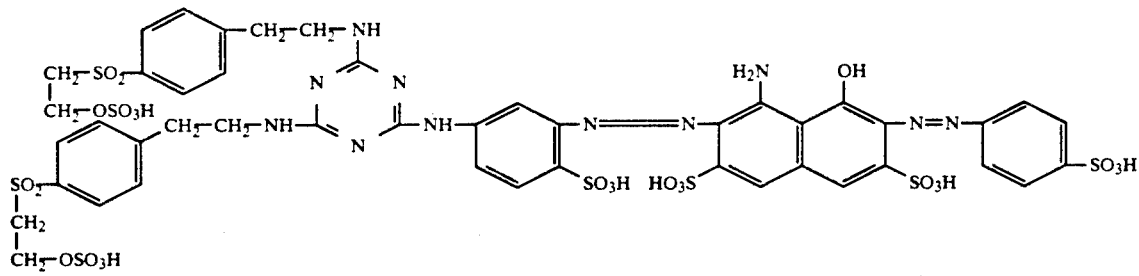

($\lambda_{max}$ = 580 nm)

which, applied to cotton by the dyeing and printing techniques customary for fiber-reactive dyes, produces reddish navy dyeings having good fastness properties.

The tertiary condensation product used as starting compound is prepared as follows: 18.8 parts of 1,3-phenylenediamine-4-sulfonic acid is reacted at a pH of 2.5 and a temperature of 10° C. with 18.4 parts of cyanuric chloride. 45.8 parts of 4-(β-hydroxyethylsulfonyl)-1-(β-aminoethyl)benzene are then added, and the two subsequent condensation reactions are carried out at a pH between 9 and 9.5 and a temperature of 80° C. After cooling down, the batch is neutralized, and the tertiary condensation product is salted out with sodium chloride, filtered off and dried. It is then esterified with sulfuric acid at 20° C. This batch is then discharged onto ice, the precipitated product is isolated and again taken up in water, and the solution is brought to pH 5 with sodium bicarbonate. The β-sulfatoethylsulfonyl-containing starting compound is then salted out again and isolated in a conventional manner.

EXAMPLES 17 TO 27

Further novel dyes conforming to a general formula (B)

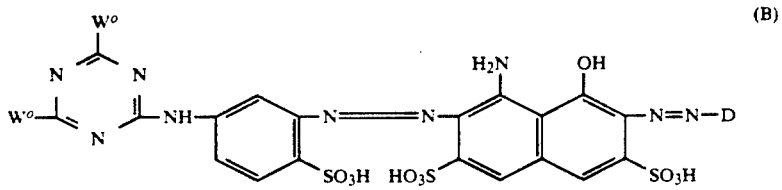

are described in Table Examples 17 to 27 below with the aid of the indicated components. They can be prepared in a manner according to the invention, for example similarly to Working Example 16, using the neutral-coupled diazo component D-NH₂, 1-amino-8-naphthol-3,6-disulfonic acid as bivalent coupling component and the condensation product of 1,3-phenylenediamine-4-sulfonic acid, cyanuric chloride and the amine H-W⁰, conforming to the general formula (24) as acid-coupled diazo component. These novel compounds conforming to the general formula (3) likewise have very good fiber-reactive dye properties and dye in particular cellulose fiber materials in the deep fast shades indicated for the particular Table Example.

| Ex. | Diazo component D-NH₂ | Amine H—W" | Hue |
|---|---|---|---|
| 17 | 1,5-disulfo-2-naphthylamine | 4-(β-phosphato-ethylsulfonyl)-1-(β-aminoethyl)-benzene | reddish navy |
| 18 | 2-chloro-4,6-disulfo-aniline | 4-(β-sulfatoethyl-sulfonyl)-1-(β-aminoethyl)benzene | reddish navy |
| 19 | 2-chloro-4-sulfo-aniline | 4-(β-methylsulfo-nyloxyethylsulfo-nyl)-2-sulfo-1- | reddish navy |

EXAMPLE 29 TO 40

Further novel dyes conforming to a general formula (C)

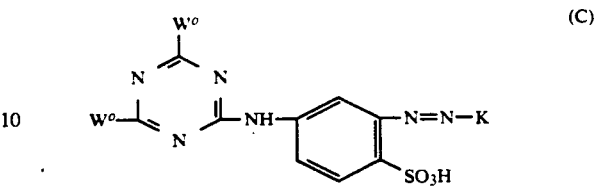

are described in Table Examples 29 to 40 below with the aid of the indicated components. They can be prepared in a manner according to the invention, for example similarly to Working Example 28, using the condensation product of 1,3-phenylenediamine-4-sulfonic acid, cyanuric chloride and the amine H-W⁰ conforming to the general formula (24) as diazo component Z-D-NH$_2$ and the coupling component H-K. These novel compounds conforming to the general formula (3) likewise have very good fiber-reactive dye properties and dye in particular cellulose fiber materials in the deep fast shades indicated for the particular Table Example.

-continued

| Ex. | Diazo component D-NH$_2$ | Amine H—W$^c$ | Hue |
|---|---|---|---|
| 20 | 2-methyl-4,6-disulfo-aniline | 4-(β-sulfatoethyl-sulfonyl)-1-(β-aminoethyl)-benzene | reddish navy |
| 21 | 4-(β-sulfatoethyl-sulfonyl)aniline | 4-(β-sulfatoethyl-sulfonyl)-1-(β-aminoethyl)benzene | reddish navy |
| 22 | 2-sulfoaniline | 4-(β-sulfatoethyl-sulfonyl)-1-(β-aminoethyl)benzene | reddish navy |
| 23 | 3,6,8-trisulfo-2-naphthylamine | 4-(β-sulfatoethyl-sulfonyl)-2-sulfo-1-(β-aminoethyl)-benzene | reddish navy |
| 24 | aniline | 4-(β-sulfatoethyl-sulfonyl)-1-(β-aminoethyl)-benzene | reddish navy |
| 25 | 4-sulfamoylaniline | 4-(β-sulfatoethyl-sulfonyl)-1-(β-aminoethyl)-benzene | reddish navy |
| 26 | 4-(β-sulfatoethyl-sulfonyl)aniline | 4-(β-sulfatoethyl-sulfonyl)-1-(β-aminoethyl)-benzene | reddish navy |
| 27 | 3-(β-sulfatoethyl-sulfonyl)aniline | 4-(β-sulfatoethyl-sulfonyl)-1-(β-aminoethyl)-benzene | reddish navy |

EXAMPLE 28

18.8 parts of 1,3-phenylenediamine-4-sulfonic acid are condensed with 18.4 parts of cyanuric chloride at a pH of 2.5 and a temperature of 10° C. The condensation product is then admixed with 30 parts of 1-(4'-sulfophenyl)-3-carboxypyrazol-5-one; the coupling reaction takes place at a pH between 5 and 7. An aqueous neutral solution of 55.8 parts of 4-(β-hydroxyethylsulfonyl)-1-β-(aminoethyl)benzene is then added, and the condensation reaction is carried out at a temperature of 80° C. and a pH of from 9 to 9.5. After the reaction has ended, the batch is neutralized, and the azo compound prepared is salted out with sodium chloride, filtered off with suction and dried and then stirred into sulfuric acid at 20° C. in order to convert the hydroxyethylsulfonyl groups into sulfatoethylsulfonyl groups. The batch is then discharged onto ice, the precipitated sulfato compound is filtered off with suction and again taken up in water, the solution is brought to pH 5 with sodium bicarbonate, and the compound is again salted out with sodium chloride, filtered off with suction and dried. The resulting alkali metal salt of the compound of formula

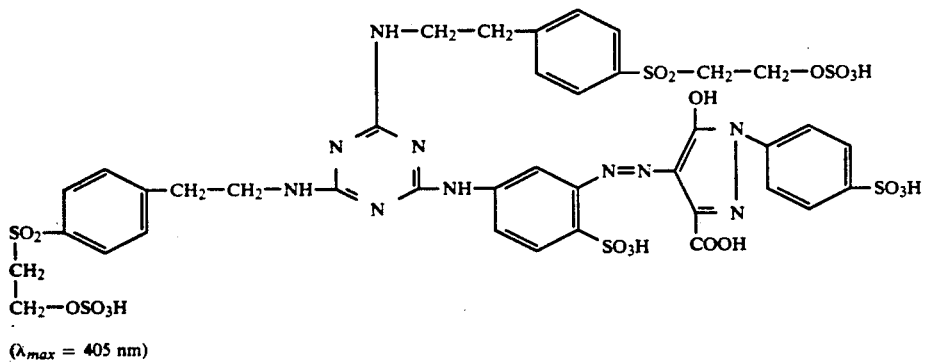

($\lambda_{max}$ = 405 nm)

dyes cotton by the dyeing methods customary for fiber-reactive dyes in fast yellow shades.

| Ex. | Coupling Component H—K | Amine H—W$^c$ | Hue |
|---|---|---|---|
| 29 | 1-(2'-methyl-4'-sulfophenyl)-3-carboxy-5-pyrazolone | 4-(β-sulfatoethyl-sulfonyl)-1-(β-aminoethyl)benzene | yellow |
| 30 | 3,6-disulfo-1-naphthol | 4-(β-sulfatoethyl-sulfonyl)-1-(β-aminoethyl)benzene | orange |
| 31 | 3,8-disulfo-1-naphthol | 4-(β-sulfatoethyl-sulfonyl)-1-(β-aminoethyl)benzene | scarlet |
| 32 | 4,8-disulfo-1-naphthol | 4-(β-sulfatoethyl-sulfonyl)-1-(β-aminoethyl)benzene | yellowish red |
| 33 | 1-naphthol-7-(3'-sulfophenyl)amino-3-sulfonic acid | 4-(β-sulfatoethyl-sulfonyl)-1-(β-aminoethyl)benzene | brown |
| 34 | 1-naphthol-7-(3'-sulfophenyl)amino-3-sulfonic acid | 4-(β-methylsulfonyloxyethylsulfonyl)-2-sulfo-1-(β-aminoethyl)-benzene | brown |
| 35 | 1-ethyl-2-hyroxy-4-methyl-5-carbamoyl-6-pyridone | 4-(β-sulfatoethyl-sulfonyl)-1-(β-aminoethyl)benzene | yellow |
| 36 | 1-(4'-sulfophenyl)-3-carboxy-5-pyrazolone | 4-(β-phosphatoethylsulfonyl)-1-(β-aminoethyl)-benzene | yellow |
| 37 | 1-(4'-sulfophenyl)-3-carboxy-5-pyrazolone | 4-(β-sulfatoethyl-sulfonyl)-2-sulfo- | yellow |

| Ex. | Coupling Component H—K | Amine H—W" | Hue |
|---|---|---|---|
| 38 | 1-(4'-sulfophenyl)-3-carboxy-5-pyrazolone | 1-(β-aminoethyl)-benzene 4-(β-methylsulfonyloxyethylsulfonyl)-2-sulfo-1-(β-aminoethyl)-benzene | yellow |
| 39 | 1-(4'-sulfophenyl)-3-carboxy-5-pyrazolone | 4-(β-phosphatoethylsulfonyl)-2-sulfo-1-(β-aminoethyl)benzene | yellow |
| 40 | 1-sulfoethyl-2-hydroxy-4-methyl-6-pyridone | 4-(β-sulfatoethylsulfonyl)-1-(β-aminoethyl)benzene | yellow |

EXAMPLES 41 TO 50

Further novel dyes conforming to a general formula (D)

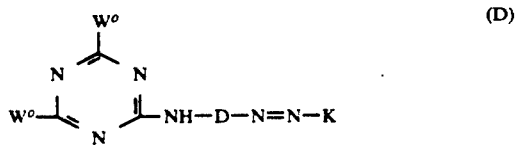

are described in Table Examples 41 to 50 below with the aid of the indicated components. They can be prepared in a manner according to the invention, for example similarly to Working Example 28, using the condensation product of a diaminobenzenesulfonic acid conforming to the formula $H_2N$-D-$NH_2$, cyanuric chloride and the amine H-$W^0$ conforming to the general formula (24) as diazo component Z-D-$NH_2$ and the coupling component H-K. These novel compounds conforming to the general formula (3) likewise have very good fiber-reactive dye properties and dye in particular cellulose fiber materials in the deep fast shades indicated for the particular Table Example.

| Ex. | Coupling componen H—K | Diaminobenzenesulfonic acid | Amine H—W" | Hue |
|---|---|---|---|---|
| 41 | 1-(4'-sulfophenyl)-3-carboxy-5-pyrazolone | 1,4-diaminobenzene-2,5-disulfonic acid | 4-(β-sulfatoethylsulfonyl)-1-(β-aminoethyl)-benzene | yellow |
| 42 | 1-(4'-β-sulfatoethylsulfonylphenyl)-3-carboxy-5-pryazolone | 1,4-diaminobenzene-2,5-disulfonic acid | 4-(β-sulfatoethylsulfonly)-1-(β-aminoethyl)-benzene | yellow |
| 43 | 1-phenyl-3-carboxy-5-pyrazolone | 1,3-diaminobenzene-4,6-disulfonic acid | 4-(β-sulfatoethylsulfonly)-1-(β-aminoethyl)-benzene | yellow |
| 44 | 1,4-dimethyl-2-hydroxy-3-sulfo-6-pydridone | 1,3-diaminobenzene-4,6-disulfonic acid | 4-(β-sulfatoethylsulfonly)-1-(β-aminoethyl)-benzene | greenish yellow |
| 45 | 1-ethyl-4-methyl-3-carbamoyl-2-hydroxy-6-pyridone | 1,3-diaminobenzene-4,6-disulfonic acid | 4-(β-sulfatoethylsulfonyl)-2-sulfo-1-(β-aminoethyl)benzene | greenish yellow |
| 46 | 1-ethyl-4-methyl-3-carbamoyl-2-hydroxy-6-pyridone | 1,3-diaminobenzene-4,6-disulfonic acid | 4-(β-phosphatoethylsulfonyl)-1-(β-aminoethyl)-benzene | greenish yellow |
| 47 | 1-ethyl-4-methyl-3-carbamoyl-2-hydroxy-6-pyridone | 1,3-diaminobenzene-4,6-disulfonic acid | 4-(β-methylsulfonyloxyethylsulfonyl)-2-sulfo-1-(β-aminoethyl)-benzene | greenish yellow |
| 48 | 1-ethyl-4-methyl-3-carbamoyl-2-hydroxy-6-pyridone | 1,4-diaminobenzene-6-sulfonic acid | 4-(β-sulfatoethylsulfonyl)-1-(β-aminoethyl)-benzene | greenish yellow |
| 49 | 1-butyl-4-methyl-3-carbamoyl-6-hydroxy-2-pyridone | 1,4-diaminobenzene-6-sulfonic acid | 4-(β-sulfatoethylsulfonyl)-1-(β-aminoethyl)-benzene | greenish yellow |
| 50 | 1-ethyl-4-methyl-3-sulfomethyl-6-hydroxy-2-pyridone | 1,3-diaminobenzene-4-sulfonic acid | 4-(β-sulfatoethylsulfonyl)-1-(β-aminoethyl)-benzene | greenish, yellow |

EXAMPLE 51

A solution of 48.3 parts of 1-(4'-sulfophenyl)-3-carboxy-4-(4'-amino-2'-sulfophenyl-1'-azo)-5-pyrazolone in 750 parts of ice-water is reacted at a temperature of between 0° and 5° C. and at a pH of 5 with 19 parts of cyanuric chloride. As soon as free amino groups are no longer detectable, 55.8 parts of 4-(β-hydroxyethylsulfonyl)-1-(β-aminoethyl)benzene are added, and the condensation reaction is carried out at 80° C. and a pH of 9 to 9.5. After the condensation reaction has ended, the batch is neutralized, and the azo compound is salted out with sodium chloride, filtered off with suction and dried. It is then esterified with sulfuric acid at 20° C. This batch is then discharged onto ice, the precipitated compound is filtered off with suction and taken up in water, the solution is brought to pH 5 with sodium bicarbonate, and the compound is again salted out with sodium chloride, filtered off and dried. The result obtained is an electrolyte-containing powder of the alkali metal salt of the azo dye of the formula

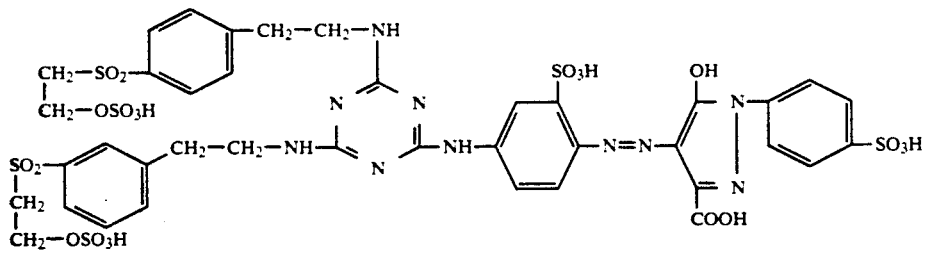

which dyes cotton by the customary dyeing methods for fiber-reactive dyes in fast golden yellow shades.

EXAMPLE 52

30.3 parts of 2-aminonaphthaline-4,6-disulfonic acid are diazotized in a hydrochloric acid medium and coupled to 15 parts of 3-acetylaminoaniline. This azo compound is acetylated from 19 parts of finely divided cyanuric chloride at a temperature of 40° C. and a pH of 7, and the monocondensation product is reacted with 55.8 part of 4-($\beta$-hydroxyethylsulfonyl)-1-($\beta$-aminoethyl)-benzene. The batch is then neutralized, and the azo compound formed is salted out with sodium chloride, isolated and converted as described in Example 51 into the sulfato form and isolated. The result obtained is the alkali metal salt of a compound of the formula

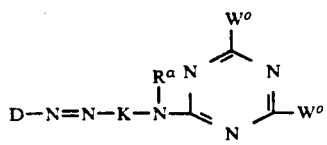

in which $W^o$ is the radical of the starting amine (24), D is the radical of the diazo component without the fiber-reactive group and K is the radical of an amino-containing coupling component conforming to the formula H-K-NHR$^a$, are described in the Table Examples which follow with the aid of the indicated components. They can be prepared in a manner according to the invention, for example as described in Working Exam-

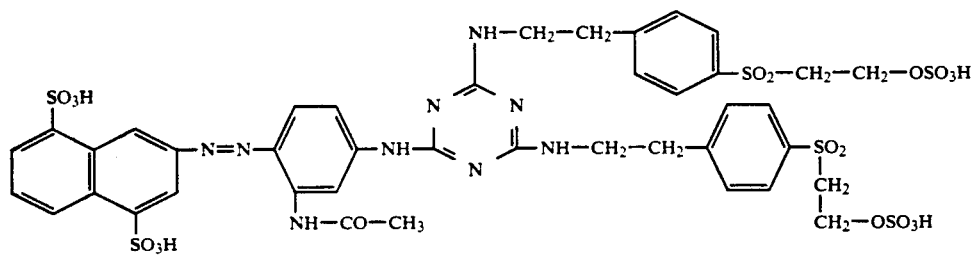

($\delta_{max}$ = 403 nm)

which dyes cotton by the customary dyeing methods for fiber-reactive dyes in fast reddish yellow shades.

EXAMPLES 53 TO 71

Further novel dye conforming to a general formula (E)

ple 52, using the diazo component D-NH$_2$, the coupling component H-K-NHR$^a$, cyanuric chloride and the amine of the general formula (24). These novel compounds conforming to the general formula (3) likewise have very good fiber-reactive dye properties and dye in particular cellulose fiber materials in the deep fast shades indicated for the particular Table Example.

| Ex. | Diazo component D-NH$_2$ | Coupling component H—K-NHR$^a$ | Amine H—W* | Hue |
|---|---|---|---|---|
| 53 | 6,8-disulfo-2-amino-naphthalene | 3-acetylaminoaniline | 4-($\beta$-sulfatoethylsulfonyl)-1-($\beta$-aminoethyl)benzene | golden yellow |
| 54 | 6,8-disulfo-2-amino-napthalene | 3-propionylaminoaniline | 4-($\beta$-sulfatoethylsulfonyl)-1-($\beta$-aminoethyl)benzene | golden yellow |
| 55 | 3,6,8-trisulfo-2-amino-naphthalene | 3-aminophenylurea | 4-($\beta$-sulfatoethylsulfonyl)-1-($\beta$-aminoethyl)benzene | golden yellow (422) |
| 56 | 3,6,8-trisulfo-2-amino-naphthalene | 3-aminophenylurea | 4-($\beta$-sulfatoethylsulfonyl)-2-sulfo-1-(aminoethyl)-benzene | golden yellow |
| 57 | 3,6,8-trisulfo-2-amino-naphthalene | 3-aminophenylurea | 4-(methylsulfonyloxyethylsulfonyl)-2-sulfo-1-($\beta$-aminoethyl)-benzene | golden yellow |
| 58 | 3,6,8-trisulfo-2-amino-naphthalene | 3-aminophenylurea | 4-($\beta$-phosphatoethylsulfonyl)-1-($\beta$-aminoethyl)benzene | golden yellow |
| 59 | 3,6,8-trisulfo-2-amino-naphthalene | N-phenyl-N'-(3-aminophenyl)urea | 4-($\beta$-sulfatoethylsulfonyl)-1-($\beta$-amino- | golden yellow |

-continued

| Ex. | Diazo component D-NH₂ | Coupling component H—K—NHR$^a$ | Amine H—W" | Hue |
|---|---|---|---|---|
| 60 | 3,6,8-trisulfo-2-amino-naphthalene | N-(3-aminophenyl)-N'-methylurea | 4-(β-sulfatoethylsulfonyl)-1-(β-aminoethyl)benzene | golden yellow |
| 61 | 4,8-disulfo-2-amino-naphthalene | N-cyclohexyl-N'-(3-aminophenyl)urea | 4-(β-sulfatoethylsulfonyl)-1-(β-aminoethyl)benzene | golden yellow |
| 62 | 4,8-disulfo-2-amino-naphthalene | N-cyclohexyl-N'-(3-aminophenyl)urea | 4-(methylsulfonyloxy-ethylsulfonyl)-2-sulfo-1-(β-aminoethyl)benzene | golden yellow |
| 63 | 4,8-disulfo-2-amino-naphthalene | 2-methoxy-5-methylaniline | 4-(β-sulfatoethylsulfonyl)-1-(β-aminoethyl)benzene | golden yellow (404) |
| 64 | 4,8-disulfo-2-amino-naphthalene | 3-methylsulfonylamino-aniline | 4-(β-sulfatoethylsulfonyl)-1-(β-aminoethyl-benzene | golden yellow |
| 65 | 1,6-disulfo-2-amino-naphthalene | 3-aminophenylurea | 4-(β-sulfatoethylsulfonyl)-1-(β-aminoethyl-benzene | golden yellow |
| 66 | 1,6-disulfo-2-amino-naphthalene | N-(3-aminophenyl)-N'-methylurea | 4-(β-sulfatoethylsulfonyl)-1-(β-aminoethyl-benzene | golden yellow |
| 67 | 3,6,8-trisulfo-2-aminonaphthalene | 3-acetylaminoaniline | 4-(β-sulfatoethylsulfonyl)-1-(β-aminoethyl-benzene | golden yellow (451) |
| 68 | 3,6,8-trisulfo-2-aminonaphthalene | 3-methylaniline | 4-(β-sulfatoethylsulfonyl)-1-(β-aminoethyl-benzene | yellow (388) |
| 69 | 4,6,8-trisulfo-2-aminonaphthalene | 3-acetylaminoaniline | 4-(β-sulfatoethylsulfonyl)-1-(β-aminoethyl-benzene | golden yellow (449) |
| 70 | 4,6,8-trisulfo-2-aminonaphthalene | 3-methylaniline | 4-(β-sulfatoethylsulfonyl)-1-(β-aminoethyl-benzene | yellow (389) |
| 71 | 4,6,8-trisulfo-2-aminonaphthalene | 3-aminophenylurea | 4-(β-sulfatoethylsulfonyl)-1-(β-aminoethyl-benzene | yellow (402) |

EXAMPLE 72

A pH 6.5 solution of 42 parts of the known aminodisazo compound of the formula

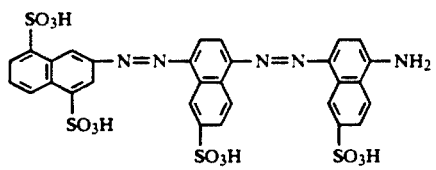

in 300 parts of water are reacted at 0° to 5° C. and at a pH of 6.5 with 10.5 parts of cyanuric chloride. The product formed is then reacted with 25.3 parts of 4-(β-hydroxyethylsulfonyl)-1-(β-aminoethyl)benzene at a temperature of 80° C. and a pH between 9 and 9.5. The tertiary condensation product is then isolated, converted into the sulfato form and again isolated as alkali metal salt, all three steps being carried out as described in Example 51. The result obtained is the electrolyte-containing dye powder of the alkali metal salt of the disazo compound

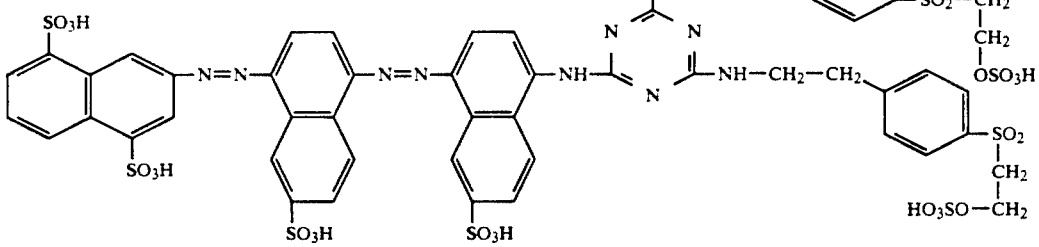

which dyes cotton in fast reddish brown shades.

EXAMPLES 73 TO 84

The Table Examples which follow describe further novel dyes conforming to a general formula F-Z which can be prepared in a manner according to the invention, for example similarly to Working Example 72, by reacting the parent compound to the radical F indicated by formula in the particular Table Example, namely the starting aminodisazo dye conforming to the general formula F-NH₂, with cyanuric chloride and 4-(β-sulfatoethylsulfonyl)-1-(β-aminoethyl)benzene. They likewise have very good fiber-reactive dye properties and dye in particular cellulose fiber materials in the deep fast shades indicated for the particular Table Example.

| Ex. | Radical F— | Hue |
|---|---|---|
| 73 | (structure) | brown |
| 74 | (structure) | reddish brown |
| 75 | (structure) | orange brown |
| 76 | (structure) | orange brown |
| 77 | (structure) | reddish brown |
| 78 | (structure) | reddish brown |

-continued

| Ex. | Radical F— | Hue |
|---|---|---|
| 79 | (structure) | orange brown |
| 80 | (structure) | brown |
| 81 | (structure) | |
| 82 | (structure) | reddish brown |
| 83 | (structure) | orange |
| 84 | (structure) | reddish brown |

EXAMPLE 85

The condensation product of 1,3-diaminobenzene-4-sulfonic acid and cyanuric chloride is diazotized in a conventional manner, and the diazonium salt is coupled at a pH between 7 and 7.5 to 2-(p-sulfophenylamino)-6-sulfo-8-naphthol. The azo compound thus obtained is then reacted at a pH between 9 and 9.5 with 4-($\beta$-sulfatoethylsulfonyl)-1-($\beta$-aminoethyl)benzene at 80° C. in a conventional manner and is converted into the sulfato form and isolated, the last two steps being carried out as described in Example 51. The result obtained is the alkali metal salt of the compound of the formula

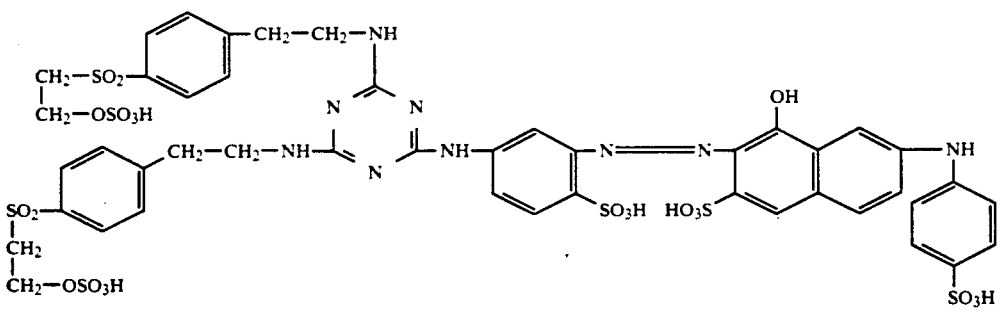

which dyes cotton by the application and fixing methods customary for fiber-reactive dyes in fast brown shades.

EXAMPLE 86

95 parts of cyanuric chloride are reacted in the conventional manner with 1-amino-3,6-disulfo-8-naphthol in water to give a monocondensation product which is then admixed with the solution of the diazonium salt of 1-aminobenzene-2-sulfonic acid in a corresponding equivalent amount; a coupling reaction takes place at a pH between 4 and 4.5. After the coupling has ended, 236 parts of 4-(β-hydroxyethylsulfonyl)-1-(β-aminoethyl)benzene are added, and the condensation reaction is carried out at a pH between 9 and 9.5 and at 80° C. The β-hydroxyethylsulfonyl-containing azo compound thus obtained is converted into the sulfato form and isolated, both steps being carried out as described in Example 51. The result obtained is the sodium salt of the compound of the formula

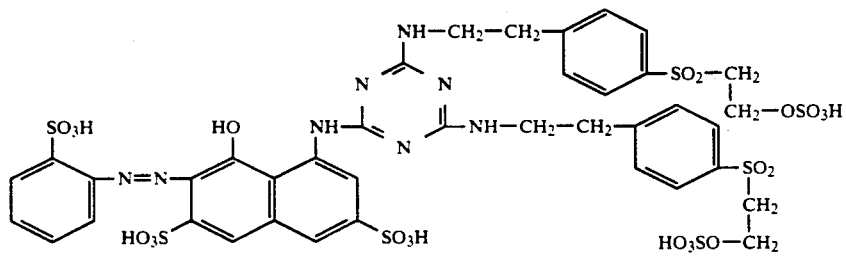

which dyes cotton in bright red fast shades.

EXAMPLES 87 TO 121

Further novel dyes conforming to a general formula (F)

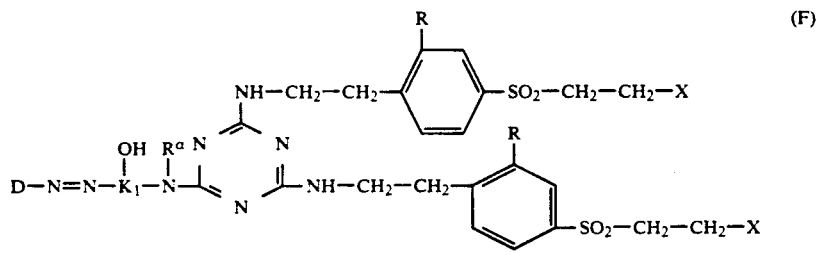

are described in the Table Examples which follow with the aid of the symbols shown in the formula (F). They can be prepared in a manner according to the invention, for example as described in Working Example 86, using the diazo component $D-NH_2$, the aminonaphtholsulfonic acid conforming to a formula $H(OH)K_1-NHR^a$ as naphtholic coupling component, and also cyanuric chloride and the appropriate amine of the general formula (24). These novel compounds conforming to the general formula (3) likewise have very good fiber-reactive dyeing properties and dye in particular cellulose fiber materials in the deep fast shades indicated for the particular Table Example.

| Ex. | Radical D | Coupling component $H(OH)K_1-NHR^a$ | Substituent R | Radical X | Hue |
|---|---|---|---|---|---|
| 87 | phenyl | 1-amino-3,6-disulfo-8-naphthol | hydrogen | sulfato | red |
| 88 | phenyl | 1-amino-3,6-disulfo-8-naphthol | sulfo | methylsulfonyloxy | red |
| 89 | phenyl | 1-amino-3,6-disulfo-8-naphthol | hydrogen | phosphato | red |

-continued

| Ex. | Radical D | Coupling component H(OH)K₁—NHRᵃ | Substituent R | Radical X | Hue |
|---|---|---|---|---|---|
| 90 | 2-chlorophenyl | 1-amino-3,6-disulfo-8-naphthol | hydrogen | sulfato | red |
| 91 | 3-methylphenyl | 1-amino-3,6-disulfo-8-naphthol | hydrogen | sulfato | red |
| 92 | 4-methoxy-2-sulfophenyl | 1-amino-3,6-disulfo-8-naphthol | hydrogen | sulfato | bluish red |
| 93 | 4-phenoxy-2-sulfophenyl | 1-amino-3,6-disulfo-8-naphthol | hydrogen | sulfato | bluish red |
| 94 | 4-ethoxyphenyl | 1-amino-3,6-disulfo-8-naphthol | hydrogen | sulfato | bluish red |
| 95 | 4-methoxyphenyl | 1-amino-3,6-disulfo-8-naphthol | hydrogen | sulfato | bluish red |
| 96 | 4-methyl-2-sulfophenyl | 1-amino-3,6-disulfo-8-naphthol | hydrogen | sulfato | bluish red |
| 97 | 4-sulfophenyl | 1-amino-3,6-disulfo-8-naphthol | hydrogen | sulfato | red |
| 98 | 3-sulfophenyl | 1-amino-3,6-disulfo-8-naphthol | hydrogen | sulfato | red |
| 99 | 1,5-disulfo-2-naphthyl | 1-amino-3,6-disulfo-8-naphthol | hydrogen | sulfato | red |
| 100 | 4,8-disulfo-2-naphthyl | 1-amino-3,6-disulfo-8-naphthol | hydrogen | sulfato | red |
| 101 | 4-sulfo-1-naphthyl | 1-amino-3,6-disulfo-8-naphthol | hydrogen | sulfato | red |
| 102 | 6-suflo-1-naphthyl | 1-amino-3,6-disulfo-8-naphthol | hydrogen | sulfato | red |
| 103 | 1-sulfo-2-naphthyl | 1-amino-3,6-disulfo-8-naphthol | hydrogen | sulfato | red |
| 104 | 5-sulfo-2-naphthyl | 1-amino-3,6-disulfo-8-naphthol | sulfo | methylsulfonyloxy | red |
| 105 | 6-sulfo-2-naphthyl | 1-amino-3,6-disulfo-8-naphthol | hydrogen | sulfato | red |
| 106 | phenyl | 1-amino-4,6-disulfo-8-naphthol | hydrogen | sulfato | scarlet |
| 107 | 2-sulfophenyl | 1-amino-4,6-disulfo-8-naphthol | hydrogen | sulfato | scarlet |
| 108 | 2-sulfophenyl | 1-amino-4-sulfo-8-naphthol | hydrogen | sulfato | scarlet |
| 109 | 2-sulfophenyl | 1-amino-4-sulfo-8-naphthol | sulfo | methylsulfonyloxy | scarlet |
| 110 | 2-sulfophenyl | 2-amino-6-sulfo-8-naphthol | hydrogen | sulfato | red |
| 111 | phenyl | 1-amino-2,4-disulfo-8-naphthol | hydrogen | sulfato | red |
| 112 | 4-sulfophenyl | 2-amino-7-sulfo-5-naphthol | hydrogen | sulfato | orange |
| 113 | 1,5-disulfo-2-naphthyl | 2-amino-7-sulfo-5-naphthol | hydrogen | sulfato | reddish orange (497) |
| 114 | 1,5-disulfo-2-naphthyl | 2-methylamino-7-sulfo-5-naphthol | hydrogen | sulfato | orange |
| 115 | 1,5-disulfo-2-naphthyl | 2-methylamino-7-sulfo-5-naphthol | sulfo | methylsulfonyloxy | orange |
| 116 | 2,5-disulfophenyl | 2-amino-7-sulfo-5-naphthol | hydrogen | sulfato | red |
| 117 | 2-sulfo-4-methylphenyl | 2-amino-7-sulfo-5-naphthol | hydrogen | sulfato | scarlet |
| 118 | 2-sulfo-4-methoxyphenyl | 2-amino-7-sulfo-5-naphthol | hydrogen | sulfato | scarlet (503) |
| 119 | 2-sulfo-4-methoxyphenyl | 2-methylamino-7-sulfo-5-naphthol | hydrogen | sulfato | orange |
| 120 | 4-(β-sulfatoethylsulfonyl)phenyl | 1-amino-3,6-disulfo-8-naphthol | hydrogen | sulfato | red |
| 121 | 3-(β-sulfatoethylsulfonyl)phenyl | 1-amino-3,6-disulfo-8-naphthol | hydrogen | sulfato | red |

EXAMPLE 122

The condensation product of 18.8 parts of 1,3-diaminobenzene-4-sulfonic acid with 18.4 parts of cyanuric chloride is diazotized and coupled onto 36.1 parts of 1-acetylamino-8-naphthol-3,6-disulfonic acid in a conventional manner. 55.8 parts of 1-(β-hydroxyethylsulfonyl)-1-(β-aminoethyl)benzene are then added, and the condensation reaction is carried out at a temperature of 80° C. and a pH between 9 and 9.5. The compound thus prepared is isolated and converted into the sulfato form, both steps being carried out as described in Example 51. The result obtained is the novel alkali metal salt of the compound of the formula

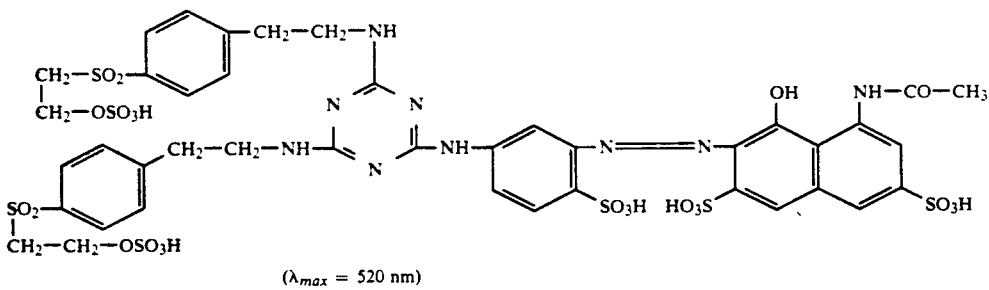

($\lambda_{max}$ = 520 nm)

which dyes cotton by the application and fixing methods customary for fiber-reactive dyes in brilliant fast red shades.

EXAMPLES 123 TO 137

Further novel dyes conforming to the above-indicated general formula (D) are described in the Table Examples which follow. They can be prepared in the same way as the corresponding preceding dyes according to the invention and likewise have good fiber-reactive dye properties.

EXAMPLE 138

31.9 parts of 1-amino-3,6-disulfo-8-naphthol are condensed with 18.5 parts of cyanuric chloride at a pH of 2.5 and a temperature of 10° C. The hydrochloric acid aqueous suspension of the diazonium salt of 27.7 parts of 4-(4'-sulfophenylazo)aniline is then added, and the coupling is carried out at a pH of 3 to 4. 55.8 parts of 4-($\beta$-hydroxyethylsulfonyl)-1-($\beta$-aminoethyl)benzene are then added, and the condensation reaction is carried out as described in Example 1. Conversion of the azo compound to the sulfato form as described in the preceding

| Ex. | Diaminobenzenesulfonic acid | Coupling component H—K | Amine H—W° | Hue |
|---|---|---|---|---|
| 123 | 1,4-diaminobenzene-4-sulfonic acid | 1-benzoylamino-3,6-disulfo-8-naphthol | 4-($\beta$-sulfatoethylsulfonyl)-1-($\beta$-aminoethyl)benzene | red |
| 124 | 1,4-diaminobenzene-4-sulfonic acid | 1-benzoylamino-4,6-disulfo-8-naphthol | 4-($\beta$-sulfatoethylsulfonyl)-1-($\beta$-aminoethyl)benzene | red |
| 125 | 1,4-diaminobenzene-4-sulfonic acid | N-(3,6-disulfo-8-hydroxynaphth-1-yl)-N'-cyclohexylurea | 4-($\beta$-sulfatoethylsulfonyl)-1-($\beta$-aminoethyl)benzene | red |
| 126 | 1,4-diaminobenzene-4-sulfonic acid | 4,8-disulfo-1-naphthol | 4-($\beta$-sulfatoethylsulfonyl)-2-sulfo-1-($\beta$-aminoethyl)benzene | red |
| 127 | 1,4-diaminobenzene-4-sulfonic acid | 4-sulfonaphthol | 4-($\beta$-sulfatoethylsulfonyl)-1-($\beta$-aminoethyl)benzene | red |
| 128 | 1,4-diaminobenzene-4-sulfonic acid | 4-sulfonaphthol | 4-($\beta$-methylsulfonyloxyethylsulfonyl)-2-sulfo-1-($\beta$-aminoethyl)benzene | red |
| 129 | 1,4-diaminobenzene-6-sulfonic acid | 1-acetylamino-3,6-disulfo-8-naphthol | 4-($\beta$-sulfatoethylsulfonyl)-1-($\beta$-aminoethyl)benzene | red |
| 130 | 1,4-diaminobenzene-6-sulfonic acid | 1-acetylamino-3,6-disulfo-8-naphthol | 4-($\beta$-phosphatoethylsulfonyl)-1-($\beta$-aminoethyl)benzene | red |
| 131 | 1,4-diaminobenzene-6-sulfonic acid | 1-actylamino-3,6-disulfo-8-naphthol | 4-($\beta$-sulfatoethylsulfonyl)-2-sulfo-1-($\beta$-aminoethyl)benzene | red |
| 132 | 1,4-diaminobenzene-6-sulfonic acid | 1-benzoylamino-3,6-disulfo-8-naphthol | 4-($\beta$-sulfatoethylsulfonyl)-2-sulfo-1-($\beta$-aminoethyl)benzene | red |
| 133 | 1,4-diaminobenzene-6-sulfonic acid | 1-benzoylamino-4,6-disulfo-8-naphthol | 4-($\beta$-sulfatoethylsulfonyl)-1-($\beta$-aminoethyl)benzene | red |
| 134 | 1,3-diamino-2-methylbenzene-5-sulfonic acid | 1-benzoylamin-4,6-disulfo-8-naphthol | 4-($\beta$-sulfatoethylsulfonyl)-1-($\beta$-aminoethyl)benzene | red |
| 135 | 1,3-diamino-2-methylbenzene-5-sulfonic acid | 1-benzoylamino-4,6-disulfo-8-naphthol | 4-($\beta$-sulfatoethylsulfonyl)-2-sulfo-1-($\beta$-aminoethyl)benzene | red |
| 136 | 1,3-diaminobenzene-4-sulfonic acid | 3-acetylamino-6-sulfo-8-naphthol | 4-($\beta$-sulfatoethylsulfonyl)-1-($\beta$-aminoethyl)benzene | red |
| 137 | 1,3-diaminobenzene-4-sulfonic acid | N-($\beta$-sulfoethyl)-6-hydroxy-4-methylpyrid-2-one | 4-($\beta$-sulfatoethylsulfonyl)-1-($\beta$-aminoethyl)benzene | yellow |

Examples and its isolation by salting out gives the alkali metal salt of the compound of the formula

EXAMPLES 140 TO 146

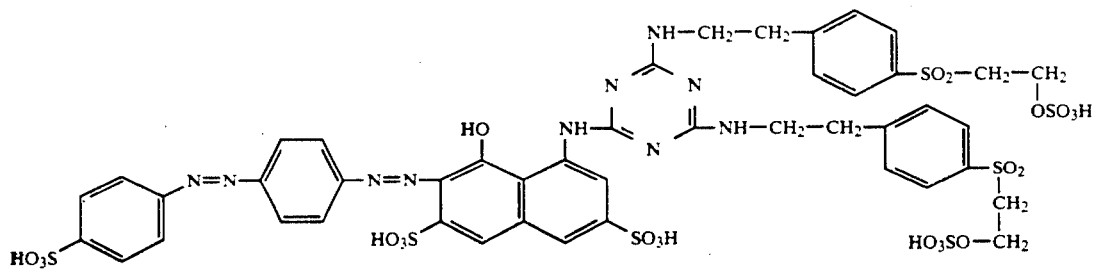

which dyes cotton by customary dyeing methods in very fast reddish violet shades.

The Table Examples which follow describe further novel anthraquinone dyes by means of the general formula (G)

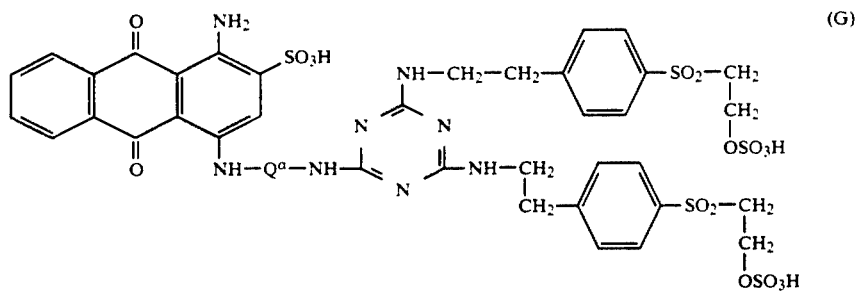

(G)

EXAMPLE 139

50.3 parts of 1-amino-4-(3'-amino-4'-methyl-5'-sulfophenyl)aminoanthraquinone-2-sulfonic acid are reacted at 0° C. and a pH of 6 to 6.5 with 18.5 parts of cyanuric chloride. An aqueous, neutral solution of 55.8 parts of 4-(β-hydroxyethylsulfonyl)-1-(β-aminoethyl)benzene is then added, and the second condensation reaction is carried out at 80° to 90° C. and a pH of 8.5. After this reaction has ended, the batch is brought to a pH of between 6.5 and 7, and the resulting compound is salted out with sodium chloride, filtered off with suction and dried. Conversion of the compound into the sulfato form as described in Example 1 gives the alkali metal salt of the compound of the formula They produce on the fiber materials mentioned in the description, in particular on cellulose fiber materials, strong dyeings having good fastness properties. They can be prepared as described in Example 139 by reacting the starting components evident from the general formula (G), preferably by starting from the β-hydroxyethylsulfonyl compound of the amine of formula (24).

| Ex | Radical —$Q^a$— | Hue on cotton |
|---|---|---|
| 140 | 1,4-phenylene | blue |
| 141 | 4-sulfo-1,3-phenylene | blue (588) |
| 142 | 3-sulfo-1,4-phenylene | blue (589) |
| 143 | 2-methyl-5-sulfo-1,3-phenylene | blue (585) |
| 144 | 1,2-ethylene | blue |
| 145 | 5-carboxy-1,3-phenylene | blue |
| 146 | 6-carboxy-1,4-phenylene | blue |

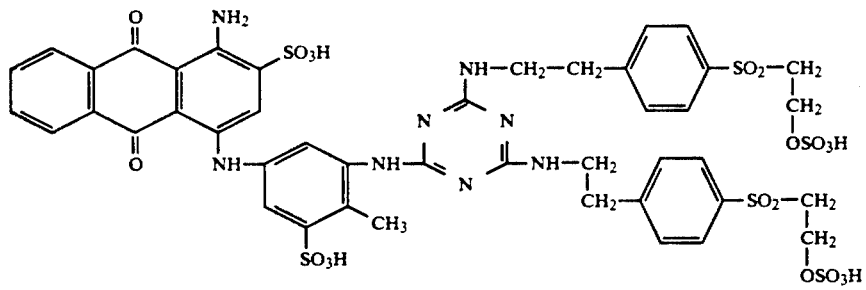

($\lambda_{max}$ = 585 nm)

which has very good dye properties and dyes the materials mentioned in the description, in particular cellulose fiber materials, such as cotton, by known methods in fast, brilliant blue shades.

EXAMPLE 147

107 parts of 3-(3'-amino-4'-sulfophenyl)amidosulfonyl(copper phthalocyanine)-3",3",-3""-trisulfonic acid are reacted at 0° C. and a pH of 6 to 6.5 with 18.5 parts of cyanuric chloride. An aqueous, neutral solution of 55.8 parts of 4-(β-hydroxyethylsulfonyl)-1-(β-aminoethyl)benzene is then added, and the reaction is carried out at 80° to 90° C. and a pH of 9 to 9.5. After the condensation reaction has ended, the pH is adjusted to 6.5 to 7, and the compound obtained is salted out with sodium chloride, filtered off with suction and dried. It is then converted with sulfuric acid into the sulfato form as described in Example 1 and isolated. The result obtained is the alkali metal salt of the compound of the formula

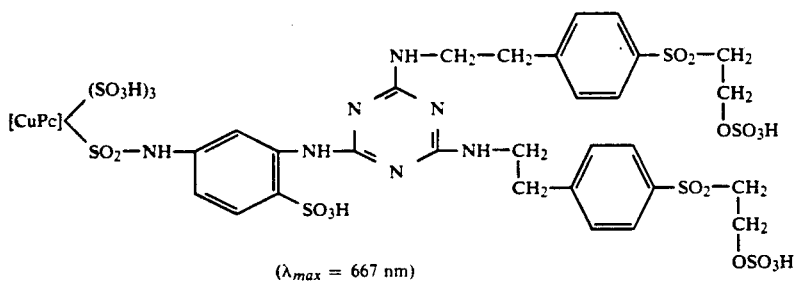

($\lambda_{max}$ = 667 nm)

which has very good dye properties and which dyes the fiber materials mentioned in the description, in particular cellulose fiber materials, such as cotton, by the dyeing methods customary for fiber-reactive dyes in fast turquoise shades.

EXAMPLES 148 TO 150

The Table Examples which follow describe further novel copper phthalocyanine dyes conforming to the general formula (H) which can be synthesized as described in Example 147. They produce in particular on cotton by the generally customary dyeing methods strong, fast dyeings in the hue indicated here for cotton.

| Ex. | Radical —$Q^a$— | Hue on cotton |
|---|---|---|
| 148 | 4-methyl-5-sulfo-1,3-phenylene | turquoise |
| 149 | 3-sulfo-1,4-phenylene | turquoise (666) |
| 150 | 2-methyl-6-sulfo-1,3-phenylene | turquoise |

EXAMPLE 151

63.5 parts of the chloranil condensation product of the formula

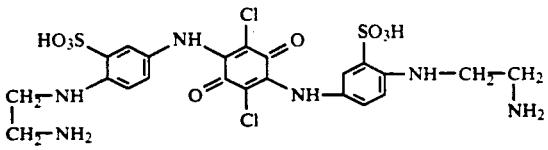

are added to an aqueous slurry of 37 parts of cyanuric chloride at 0° to 5° C. and the batch is then stirred for 2 to 3 hours at a pH of 1.8 to 2.2 and at a temperature of 0° to 5° C. After the acylation has ended, the pH is adjusted to 6 to 6.5, and an aqueous solution of 124 parts of 4-(β-hydroxyethylsulfonyl)-1-(β-aminoethyl)benzene is added. The condensation reaction is carried out at a pH of 8.5 to 9 and at a temperature of 80° to 90° C. The batch is then brought to a pH of 6.5 and clarified by means of kieselguhr and filtration, and the reaction product is salted out at a pH of 4 by means of sodium chloride, isolated and dried.

The isolated product is introduced at a temperature of 20° to 25° C. into a mixture of 603 parts of sulfuric acid and 110 parts of 65% strength oleum. The mixture is subsequently stirred for 2 to 3 hours, and 48 parts of sodium peroxodisulfate are then added at 20° to 25° C. over 2 hours. After further stirring for 2 to 4 hours, the reaction mixture is discharged onto about 2,500 parts of crushed ice, about 560 parts of calcium carbonate are added to set a pH of about 2, and the mixture is brought to pH 5 with sodium bicarbonate. The precipitated calcium sulfate is removed by filtration, the residue is thoroughly washed, the filtrate is treated with oxalic acid to remove residual calcium ions and filtered, and the new filtrate is evaporated under reduced pressure at 60° C.

The novel dye of the formula (written in the form of the free acid)

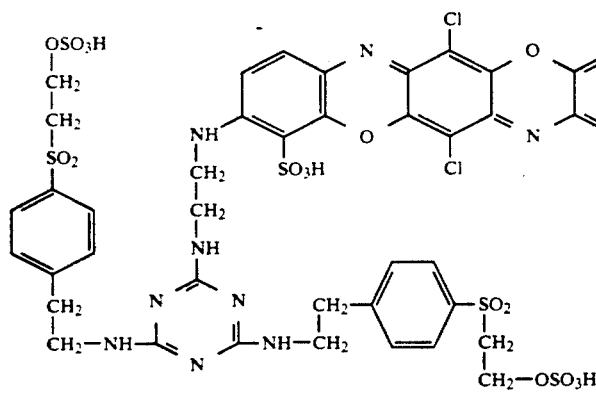
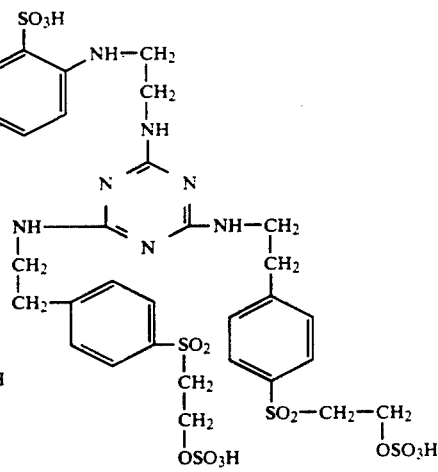

is obtained as the sodium salt in the form of an electrolyte-containing powder. It has very good dye properties and produces on the materials mentioned in the description, in particular cellulose fiber materials, by the application and fixing methods customary for fiber-reactive dyes strong blue dyeings and prints having good fastness properties.

and 25 parts of copper sulfate. A pH of 5 to 5.5 is established, the temperature is maintained at 25° to 30° C. for 2 hours. After the reaction has ended, the formed compound according to the invention is salted out with sodium chloride as a sodium salt, filtered off with suction and dried. It has, written in the form of the free acid, the formula

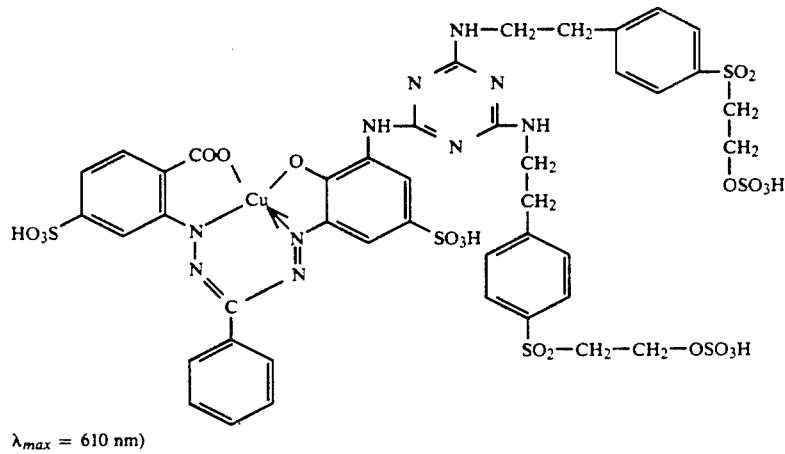

($\lambda_{max}$ = 610 nm)

EXAMPLE 151 A 23.4 parts of 2-hydroxy-3-nitro-5-sulfoaniline are reacted with 18.5 parts of cyanuric chloride at a pH of 2.5 and a temperature of 10° C. The second condensation reaction is carried out with 55.8 parts of 4-(β-hydroxyethylsulfonyl)-1-(β-aminoethyl)benzene at 80° C. and a pH of 8.5 to 9. After the reaction has ended, the batch is brought to pH 6.5 to 7 and clarified by means of kieselguhr and filtration, and the compound is precipitated from the filtrate by means of sodium chloride, filtered off with suction and reduced at 70° C. by means of hydrogen over a Pd/C catalyst. After the hydrogenation has ended, the mixture is filtered, the filtrate is brought to pH 5, and the compound formed is salted out with sodium chloride, filtered off and dried. It is subsequently converted into the sulfato compound as described in Working Example 1 and isolated.

90 parts of this aminophenol derivative are diazotized in a conventional manner in a hydrochloric acid medium and then admixed with an aqueous solution of 32 parts of 2-(benzylidenehydrazino)-4-sulfobenzoic acid and is notable for very good dye properties. It dyes in particular cotton by the application and fixing methods customary for fiber-reactive dyes in fast blue shades.

EXAMPLES 152 TO 162

Similarly useful copper formazan dyes according to the invention are obtained by the process of preparation according to the invention from the hydrazine, aldehyde and diazo components below, provided at least one of the aldehyde and diazo components contains an acetylamino group. For instance, these starting compounds are reacted to obtain a copper formazan compound, the acetylamino group is hydrolyzed and reacted with cyanuric chloride, and the dichlorotriazinylaminocopper formazan product is then condensed with a compound conforming to the general formula (24), for example with 4-(β-hydroxyethylsulfonyl)-1-(β-aminoethyl)benzene, and subsequently sulfated. It is advantageous to use in particular those copper formazan compounds which contain at least three sulfo groups per dye molecule.

Hydrazine components:

2-hydroxyphenylhydrazine, 6-nitro-2-hydroxyphenylhydrazine, 4-chloro-2-carboxyphenylhydrazine, 5-nitro-2-carboxyphenylhydrazine, 4-methoxy-2-carboxyphenylhydrazine, 4-nitro-2-hydroxy-6-sulfophenylhydrazine, 6-nitro-2-hydroxy-4-sulfophenylhydrazine, 2-carboxy-5-sulfophenylhydrazine, 2-hydroxy-6-carboxy-4-sulfophenylhydrazine, 2-hydroxy-4,6-disulfophenylhydrazine, 2-hydroxy-4-sulfonaphthylhydrazine, 2-hydroxy-4,6'-disulfonaphthyl-1-hydrazine, 2-carboxy-4-acetylaminophenylhydrazine.

Aldehyde components:

benzaldehyde, 4-methylbenzaldehyde- benzaldehyde-2- or -3- or 4-sulfonic acid, benzaldehyde-2,4-disulfonic acid, 2- or 3- or 4-nitrobenzaldehyde, 2-chlorobenzaldehyde-5-sulfonic acid, 2- or 3- or 4-acetylaminobenzaldehyde, 3-acetylaminobenzaldehyde-4-sulfonic acid, 5-acetylaminobenzaldehyde- 2-sulfonic acid.

Diazo components:

1-amino-3-acetylamino-2-hydroxybenzene-5-sulfonic acid, 1-amino-5-acetylamino-2-hydroxybenzene-3-sulfonic acid, 3-chloro-1-amino-2-hydroxybenzene-5-sulfonic acid, 5-nitro-1-amino-2-hydroxybenzene-3-sulfonic acid, 5-nitro-1-amino-2-hydroxybenzene-4-sulfonic acid, 1-amino-2-hydroxybenzene-4,6-disulfonic acid, 1-amino-2-hydroxybenzene-3,5-disulfonic acid.

This produces for example the copper complex formazan dyes conforming to the general formula

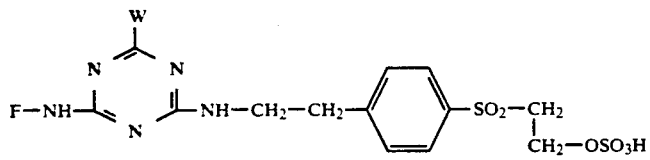

specified in the Table Examples below by means of the symbols F and W, which have very good dye properties and dye for example cellulose fiber materials in the deep shades indicated in the particular Table Example.

| Ex. | Radical F—NH— | Radical W | Hue |
|---|---|---|---|
| 152 | N-(2-carboxy-5-sulfophenyl)-N'-(2'-hydroxy-3'-amino-5'-sulfophenyl)-ms-phenyl-(copper formazan) | 4-(β-sulfatoethylsulfonyl)phenylamino | blue (610) |
| 153 | N-(2-carboxy-4-sulfophenyl)-N'-(2'-hydroxy-3'-amino-5'-sulfophenyl)-ms-phenyl-(copper formazan) | β-[4-(β'-sulfatoethylsulfonyl)phenyl]ethylamino | blue |
| 154 | N-(2-carboxy-5-sulfophenyl)-N'-(2'-hydroxy-3'-amino-5'-sulfophenyl)-ms-phenyl-(copper formazan) | 3-(β-sulfatoethylsulfonyl)phenylamino | blue (611) |
| 155 | N-(2-carboxy-5-sulfophenyl)-N'-(2'- | 3-sulfophenylamino | blue (611) |

| Ex. | Radical F—NH— | Radical W | Hue |
|---|---|---|---|
| | hydroxy-3'-amino-5'-sulfophenyl)-ms-phenyl-(copper formazan) | | |
| 156 | N-(2-carboxy-4-sulfophenyl)-N'-(2'-hydroxy-3'-amino-5'-sulfophenyl)-ms-(2''-chloro-5''-sulfophenyl)-(copper formazan) | β-[4-(β'-sulfatoethylsulfonyl)phenyl]ethylamino | blue |
| 157 | N-(2-carboxy-5-amino-phenyl)-N'-(2'-hydroxy-3',5'-disulfophenyl)-ms-(3''-aminophenyl)-(copper formazan) | β-[4-(β'-sulfatoethylsulfonyl)phenyl]ethylamino | greenish blue |
| 158 | N-(2-hydroxy-3-amino-5-sulfophenyl)-N'-(2'-hydroxy-4'-sulfophenyl)-ms-(2''-sulfophenyl)-(copper formazan) | β-[4-(β'-sulfatoethylsulfonyl)phenyl]ethylamino | navy blue |
| 159 | N-(2-hydroxy-5-sulfophenyl)-N'-(2'-hydroxy-3',5'-disulfophenyl)-ms-(4''-aminophenyl)-(copper formazan) | β-[4-(β'-sulfatoethylsulfonyl)phenyl]ethylamino | blue |
| 160 | N-(2-hydroxy-5-amino-3-sulfophenyl)-N'-(2',5'-disulfophenyl)-ms-phenyl-(copper formazan) | β-[4-(β'-sulfatoethylsulfonyl)phenyl]ethylamino | blue |
| 161 | N-(2-hydroxy-4,6-disulfophenyl)-N'-(2',4'-disulfophenyl)-ms-(3''-aminophenyl)-(copper formazan) | β-[4-(β'-sulfatoethylsulfonyl)phenyl]ethylamino | blue |
| 162 | N-(2-hydroxy-4-sulfophenyl)-N'-(4'-amino-2'-sulfophenyl)-ms-(4''-chloro-3''-sulfophenyl)-(copper formazan) | β-[4-(β'-sulfatoethylsulfonyl)phenyl]ethylamino | blue |

EXAMPLE 163

9 parts of morpholine are added at 0° C. to a suspension of 19 parts of cyanuric chloride in 200 parts by volume of water. During the reaction, the pH is maintained at 4 by means of sodium bicarbonate. 31 parts of β-[4-(β'-sulfatoethylsulfonyl)phenyl]ethylamine are then added, and the reaction is carried out at 40° C. and a pH of 6.5. After the reaction has ended, which can be determined by thin layer chromatography, 45 parts of 4-[4',8'-disulfo-2'-naphthyl]-azo-3-acetylaminoaniline are added, and the third condensation reaction is carried out at a pH between 3.5 and 4 under reflux. After the reaction has ended, the batch is clarified in a conventional manner, and the azo compound according to the invention is salted out of the filtrate by means of sodium chloride.

The result obtained is a yellow, electrolyte-containing powder of the alkali metal salt (sodium salt) of the compound of the formula

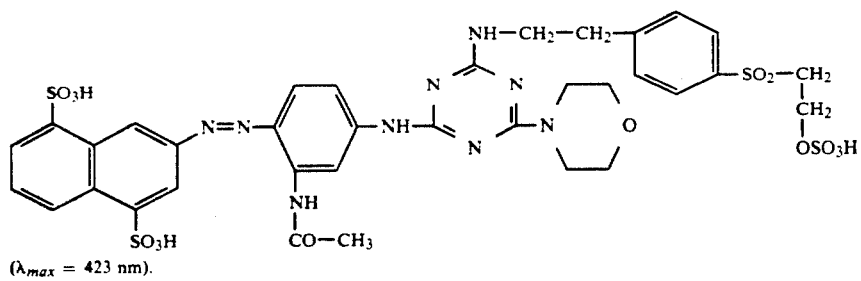

($\lambda_{max}$ = 423 nm).

The azo compound according to the invention has very good fiber-reactive dye properties and produces on the materials mentioned in the description, in partic- The azo compound according to the invention, obtained as an alkali metal salt (sodium salt), has, written in the form of the free acid, the formula

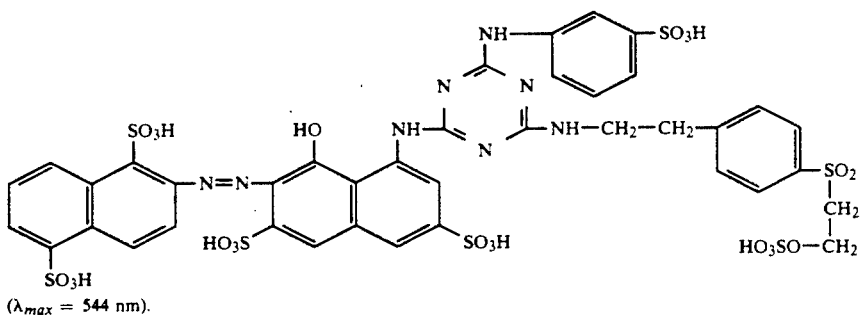

($\lambda_{max}$ = 544 nm).

ular cellulose fiber materials, such as cotton, strong dyeings and prints in yellow having good fastness properties. The azo compound according to the invention produces excellent dyeings in particular in the pad hot-steam fixing process.

EXAMPLE 164

19 parts of cyanuric chloride are reacted in aqueous suspension with 31 parts of β-[4-(β'-sulfatoethylsulfonyl)phenyl]ethylamine at 0° C. and pH 4. 60 parts of 7-(1',5'-disulfonaphth-2'-yl)-azo-1-amino-8-hydroxy-3,6-disulfonaphthalene are added to the monocondensation product, and the second coupling reaction is carried out at a pH of 3.5 and a temperature of 40° C. After the reaction has ended, 17 parts of 3-sulfoaniline are added, and the third condensation reaction is carried out at 90° C. and pH .... The reaction batch is then clarified in a conventional manner, and the azo compound according to the invention is isolated by salting out with sodium chloride.

It has very good fiber-reactive dye properties and dyes for example cotton in deep bluish red shades having good fastness properties, of which in particular the chlorinated water fastness may be singled out.

EXAMPLES 165 TO 170

Further novel azo dyes conforming to a general formula (J)

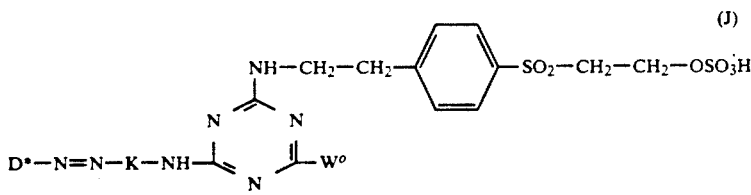

(J)

in which $W^0$ is the radical of the starting amine (24), D* is the radical of the diazo component and K is the radical of an amino-containing coupling component conforming to the general formula H-K-NH$_2$, are described in the Table Examples which follow with the aid of the indicated components. They can be prepared in a manner according to the invention, for example as described in the above Working Examples, from the evident starting components. The novel azo compounds likewise have very good fiber-reactive dye properties and dye in particular cellulose fiber materials in the deep fast shades indicated for the particular table example.

| Ex. | Diazo component D*-NH$_2$ | Coupling component H—K—NH$_2$ | Amine H—W* | Hue |
|---|---|---|---|---|
| 165 | 4-methoxy-2-sulfophenyl | 3-amino-6-sulfo-8-naphthol | 3-sulfophenyl | scarlet (504) |
| 166 | 4-(β-sulfatoethylsulfonyl)phenyl | 3,6-disulfo-1-amino-8-naphthol | 3-sulfophenyl | bluish red |
| 167 | 4-(β-sulfatoethylsulfonyl)phenyl | 3,6-disulfo-1-amino-8-naphthol | 4-sulfophenyl | bluish red |

-continued

| Ex. | Diazo component D*-NH₂ | Coupling component H—K—NH₂ | Amine H—W' | Hue |
|---|---|---|---|---|
| 168 | 4-(β-sulfatoethylsulfonyl)phenyl | 4,6-disulfo-1-amino-8-naphthol | 3-sulfophenyl | red |
| 169 | 4-methoxy-2-sulfophenyl | 3-amino-6-sulfo-8-naphthol | N-piperidino | scarlet |
| 170 | 2-sulfophenyl | 4,6-disulfo-1-aminonaphthol | N-morpholino | red |

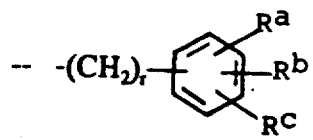

We claim:

1. A compound conforming to the formula

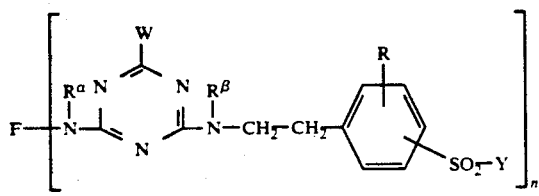

wherein
F is a sulfo-containing copper phthalocyanine, nickel phthalocyanine, anthraquinone or copper formazan dye radial, and
n is 1 or 2,
$R^α$ is hydrogen or alkyl of 1 to 4 carbon atoms,
$R^β$ is hydrogen or alkyl of 1 to 4 carbon atoms,
R is hydrogen or sulfo,
Y is vinyl or a group of the formula —CH₂—CH₂—X, in which X is a substituent which is eliminatable as an anion to form a vinyl group,
W is hydroxy, N-morpholino, N-piperidinyl, N-pyrrolidinyl or a group of the formula (2)

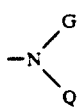   (2)

where
G is hydrogen or alkyl of 1 to 6 carbon atoms and
Q is a group of the formula

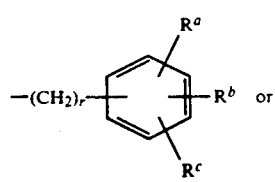

—(CH₂)ᵣ—$R^a$ or

—(CH₂)ᵣ—O—(CH₂)ᵥᵥ—$R^a$ or

—(CH₂)ᵣ—$R^b$ where
$R^a$ is a group of the formula —SO₂—Y, where Y is as defined above, or sulfo,
$R^b$ is hydrogen, alkoxy of 1 to 4 carbon atoms, sulfo, hydroxy, carboxy or chlorine,
$R^c$ is hydrogen, alkyl of 1 to 4 carbon atoms or alkoxy of 1 to 4 carbon atoms,
t is from 1 to 6, and
w is from 1 to 6, or
W is a group of the formula —A—(CH₂)ᵣ—$R^a$ where
$R^a$ is as defined above,
r is zero, 1 or 2, and
A is a radical of the formula

2. A compound of the formula

Z—D—N=N—(E—N=N)ₖK wherein:
Z is a group of the formula

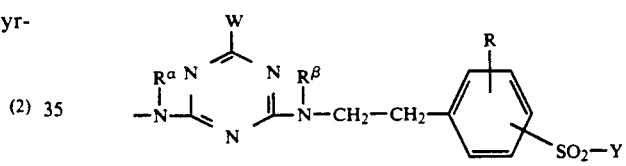

where
$R^α$ is hydrogen or alkyl of 1 to 4 carbon atoms,
$R^β$ is hydrogen or alkyl of 1 to 4 carbon atoms,
R is hydrogen or sulfo,
Y is vinyl or a group of the formula —CH₂—CH₂—X, in which X is a substituent which is eliminatable as an anion to form a vinyl group,
W is hydroxy, N-morpholino, N-piperidinyl, N-pyrrolidinyl or a group of the formula (2)

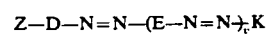   (2)

wherein
G is hydrogen or alkyl of 1 to 6 carbon atoms and
Q is a group of the formula

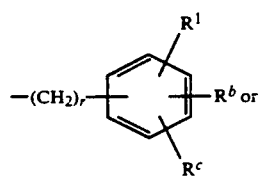

—(CH₂)ᵣ—$R^a$ or

—(CH$_2$)$_t$—O—(CH$_2$)$_w$—R$^a$ or

—(CH$_2$)$_t$—R$^b$ where
R$^a$ is a group of the formula —SO$_2$—Y, where Y is as defined above, or sulfo,
R$^b$ is hydrogen, alkoxy of 1 to 4 carbon atoms, sulfo, hydroxy, carboxy or chlorine,
R$^c$ is hydrogen, alkyl of 1 to 4 carbon atoms or alkoxy of 1 to 4 carbon atoms,
t is from 1 to 6, and
w is from 1 to 6, or
W is a group of the formula —A—(CH$_2$)$_t$—R$^a$ where
R$^a$ is as defined above,
r is zero, 1 or 2, and
A is a radical of the formula

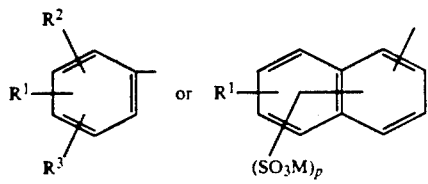

D is a group of the formula

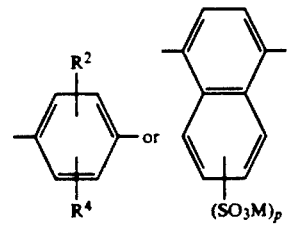

where
R$^2$ is hydrogen, methyl, ethyl, methoxy, ethoxy, alkanoyl of 2 to 5 carbon atoms, cyano, carboxy, sulfo, alkoxycarbonyl of 2 to 5 carbon atoms, carbamoyl, N-(C$_1$-C$_4$-alkyl)carbamoyl, fluorine, chlorine, bromine or trifluoromethyl,
R$^3$ is hydrogen methyl, ethyl, methoxy, ethoxy, cyano, carboxy, sulfo, alkanoylamino of 2 to 5 carbon atoms, alkoxycarbonyl of 2 to 5 carbon atoms, carbamoyl, N-(C$_1$-C$_4$-alkyl)carbamoyl, fluorine, chlorine, nitro, sulfamoyl, N-(C$_1$-C$_4$-alkyl)sulfamoyl, alkylsulfonyl of 1 to 4 carbon atoms, phenylsulfonyl or phenoxy,
p is zero, 1, or 2, and
M is hydrogen or an alkali metal;
E is a group of the formula

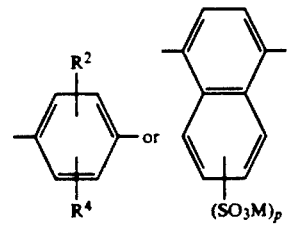

wherein R$^4$ is hydrogen, alkyl of 1 to 4 carbons, alkoxy of 1 to 4 carbons, chlorine, alkanoylamino of 2 to 5 carbons, benzoylamino, ureido, phenylureido, alkylureido with an alkyl of 1 to 4 carbons, phenylsulfonyl or alkylsulfonyl of 1 to 4 carbons and R$^2$, p and M are defined as above;
v is zero or 1;
K is a group of the formula

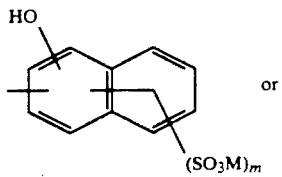

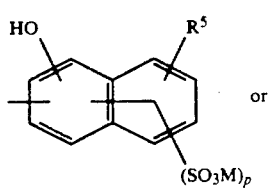

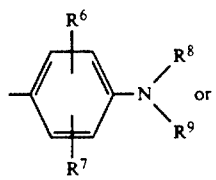

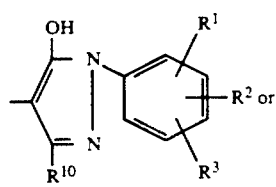

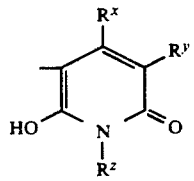

wherein
R$^1$ is hydrogen, sulfo or a group of the formula —SO$_2$—Y, where Y is is vinyl or a group of the formula —CH$_2$—CH$_2$—X, in which X is a substituent which is eliminatable as an anion to form a vinyl group,
R$^2$, R$^3$, p and M are defined as above,
R$^5$ is alkylureido with an alkyl of 1 to 6 carbons, phenylureido, phenylureido substituted in the phenyl moiety by substituents selected from chlorine, methyl, methoxy, nitro, sulfo and carboxy, or is alkanoylamino or 2 to 7 carbons, cyclohexanoylamino, benzoylamino or benzoylamino substituted in the benzene moiety by substituents selected from chlorine, methyl, methoxy, nitro, sulfo and carboxy,
R$^6$ is hydrogen, alkyl of 1 to 4 carbons, alkoxy of 1 to 4 carbons, bromine, chlorine or alkanoylamino of 2 to 7 carbons,
R$^7$ is hydrogen, alkyl of 1 to 4 carbons, alkoxy of 1 to 4 carbons, chlorine, alkanoylamino of 2 to 7 carbons, ureido or phenylureido, R⁸ is hydrogen, alkyl of 1 to 4 carbons unsubstituted or substituted by hydroxy, cyano, carboxy, sulfo, sulfato, methoxycarbonyl, ethoxycarbonyl or acetoxy, R⁹ is alkyl of 1 to 4 carbons unsubstituted or substituted by hydroxy, cyano, carboxy, sulfo, sulfato, methoxycarbonyl, ethoxycarbonyl or acetoxy, or is benzyl or phenyl, or is phenyl substituted by substituents selected from alkyl of 1 to 4 carbons, alkoxy of 1 to 4 carbons, chlorine and sulfo, R¹⁰ is hydrogen, alkyl of 1 to 4 carbons, cyano, carboxy, carbalkoxy of 2 to 5 carbons, carbamoyl or phenyl, Rˣ is hydrogen, alkyl of 1 to 4 carbons, or alkyl of 1 to 4 carbons substituted by alkoxy of 1 to 4 carbons or by cyano, Rʸ is hydrogen, sulfo, sulfoalkyl with alkyl of 1 to 4 carbons, cyano or carbamoyl, Rᶻ is hydrogen or alkyl of 1 to 6 carbons, or is alkyl of 1 to 6 carbons substituted by phenyl, sulfo or sulfophenyl, and m is zero, 1, 2 or 3.

3. A compound of the formula

D—N=N—(E—N=N)ᵥ—K—Z wherein
D is a group of the formula

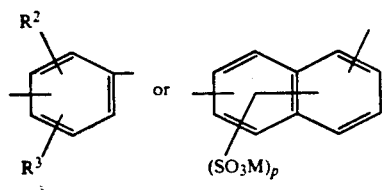

where
R¹ is hydrogen, sulfo or a group of the formula —SO₂—Y, where Y is vinyl or a group of the formula —CH₂—CH₂—X, in which X is a substituent which is eliminatable as an anion to form a vinyl group, R² is hydrogen, methyl, ethyl, methoxy, ethoxy, alkanoyl of 2 to 5 carbon atoms, cyano, carboxy, sulfo, alkoxycarbonyl of 2 to 5 carbon atoms, carbamoyl, N-(C₁-C₄-alkyl)carbamoyl, fluorine, chlorine, bromine or trifluoromethyl, is hydrogen, methyl, ethyl, methoxy, ethoxy, cyano, carboxy, sulfo, alkanoylamino of 2 to 5 carbon atoms, alkoxycarbonyl of 2 to 5 carbon atoms, carbamoyl, N-(C₁-C₄-alkyl)carbamoyl, fluorine, chorine, nitro, sulfamoyl, N-(C₁-C₄-alkyl)sulfamoyl, alkylsulfonyl of 1 to 4 carbon atoms, phenylsulfonyl or phenoxy, p is zero, 1, or 2, and
M is hydrogen or an alkali metal;
E is a group of the formula

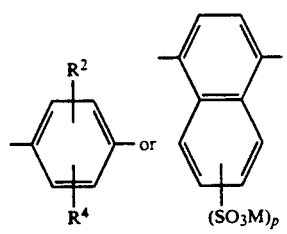

wherein R⁴ is hydrogen, alkyl of 1 to 4 carbons, alkoxy of 1 to 4 carbons, chlorine, alkanoylamino of 2 to 5 carbons, benzoylamino, ureido, phenylureido, alkylureido with an alkyl of 1 to 4 carbons, phenylsulfonyl or alkylsulfonyl of 1 to 4 carbons and R², M and p are defined as above;

v is zero or 1;
the group -K-Z is of the formula

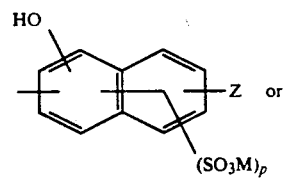

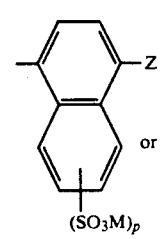

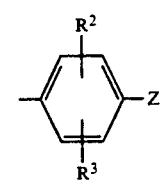

wherein
R² is hydrogen, methyl, methoxy, chlorine, carboxy or sulfo,
R³ is hydrogen, methyl, methoxy, chlorine, carboxy, sulfo or acetylamino,
p is zero, 1 or 2,
M is hydrogen or an alkali metal, and
Z is a group of the formula

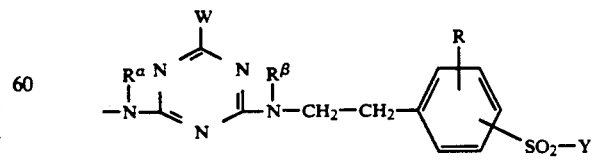

where
Rᵅ is hydrogen or alkyl of 1 to 4 carbon atoms,
Rᵝ is hydrogen or alkyl of 1 to 4 carbon atoms,
R is hydrogen or sulfo, Y is vinyl or a group of the formula —CH₂—CH₂—X, in which X is a substituent which is eliminatable as an anion to form a vinyl group, W is hydroxy, N-morpholino, N-piperidinyl, N-pyrrolidinyl or a group of the formula (2)

$$-N\begin{matrix} G \\ Q \end{matrix} \quad (2)$$

where
G is hydrogen or alkyl of 1 to 6 carbon atoms and
Q is a group of the formula $$-(CH_2)_4-\text{[benzene ring with } R^a, R^b, R^c\text{]} \text{ or}$$

—(CH₂)ᵣ—Rᵃ or

—(CH₂)ᵣ—O—(CH₂)ʷ—Rᵃ or

—(CH₂)ᵣ—Rᵇ where
Rᵃ is a group of the formula —SO₂—Y, where Y is as defined above, or sulfo,
  Rᵇ is hydrogen, alkoxy of 1 to 4 carbon atoms, sulfo, hydroxy, carboxy or chlorine,
  Rᶜ is hydrogen, alkyl of 1 to 4 carbon atoms or alkoxy of 1 to 4 carbon atoms,
  t is from 1 to 6, and
  w is from 1 to 6, or
  W is a group of the formula

—A—(CH₂)ᵣ—Rᵃ where
Rᵃ is as defined above,
r is zero, 1 or 2, and
A is a radical of the formula $$-N\underset{\diagdown\!\!\!\diagup}{\diagup\!\!\!\diagdown} N- \quad \text{or} \quad -N\underset{\diagdown\!\!\!\diagup}{\diagup\!\!\!\diagdown} \quad \text{or} \quad -N\underset{\diagdown\!\!\!\diagup}{\diagup\!\!\!\diagdown}$$

4. A compound of the formula

Z—D—N=N—(E—N=N)ₖ—K—Z wherein:
Z is a group of the formula

[Structure showing a triazine-like ring with W, Rᵃ, Rᵝ substituents connected to —N—CH₂—CH₂—[benzene ring with R]—SO₂—Y]

where
Rᵅ is hydrogen or alkyl of 1 to 4 carbon atoms,
Rᵝ is hydrogen or alkyl of 1 to 4 carbon atoms,
R is hydrogen or sulfo,
Y is vinyl or a group of the formula —CH₂—CH₂—X, in which X is a substituent which is eliminatable as an anion to form a vinyl group,
W is hydroxy, N-morpholino, N-piperidinyl, N-pyrrolidinyl or a group of the formula (2)

$$-N\begin{matrix} G \\ Q \end{matrix} \quad (2)$$

where
G is hydrogen or alkyl of 1 to 6 carbon atoms and
Q is a group of the formula $$-(CH_2)_4-\text{[benzene ring with } R^a, R^b, R^c\text{]} \text{ or}$$

—(CH₂)ᵣ—Rᵃ or

—(CH₂)ᵣ—O—(CH₂)ʷ—Rᵃ or

—CH₂)ᵣ—Rᵇ where
Rᵃ is a group of the formula —SO₂—Y, where Y is as defined above, or sulfo,
  Rᵇ is hydrogen, alkoxy of 1 to 4 carbon atoms, sulfo, hydroxy, carboxy or chlorine,
  Rᶜ is hydrogen, alkyl of 1 to 4 carbon atoms or alkoxy of 1 to 4 carbon atoms,
  t is from 1 to 6, and
  w is from 1 to 6, or
  W is a group of the formula

—A—(CH₂)ᵣ—Rᵃ where
Rᵃ is as defined above,
r is zero, 1 or 2, and
A is a radical of the formula $$-N\underset{\diagdown\!\!\!\diagup}{\diagup\!\!\!\diagdown} N- \quad \text{or} \quad -N\underset{\diagdown\!\!\!\diagup}{\diagup\!\!\!\diagdown} \quad \text{or} \quad -N\underset{\diagdown\!\!\!\diagup}{\diagup\!\!\!\diagdown}$$

D is a group of the formula

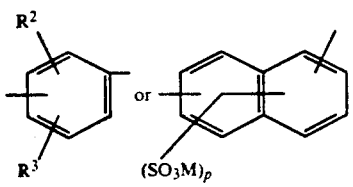

where
- $R^2$ is hydrogen, methyl, ethyl, methoxy, ethoxy, alkanoyl of 2 to 5 carbon atoms, cyano, carboxy, sulfo, alkoxycarbonyl of 2 to 5 carbon atoms, carbamoyl, N-($C_1$-$C_4$-alkyl)carbamoyl, fluorine, chlorine, bromine or trifluoromethyl,
- $R^3$ is hydrogen, methyl, ethyl, methoxy, ethoxy, cyano, carboxy, sulfo, alkanoylamino of 2 to 5 carbon atoms, alkoxycarbonyl of 2 to 5 carbon atoms, carbamoyl, N-($C_1$-$C_4$-alkyl)carbamoyl, fluorine, chlorine, nitro, sulfamoyl, N-($C_1$-$C_4$-alkyl)sulfamoyl, alkylsulfonyl of 1 to 4 carbon atoms, phenylsulfonyl or phenoxy,
- p is zero, 1 or 2, and
- M is hydrogen or an alkali metal;
- E is a group of the formula

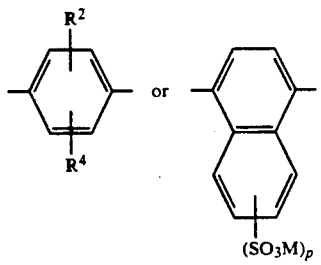

wherein $R^4$ is hydrogen, alkyl of 1 to 4 carbons, alkoxy of 1 to 4 carbons, chlorine, alkanoylamino of 2 to 5 carbons, benzoylamino, ureido, phenylureido, alkylureido with an alkyl of 1 to 4 carbons, phenylsulfonyl or alkylsulfonyl of 1 to 4 carbons and $R^2$, p and M are defined as above;
v is zero or 1;
the group -K-Z is of the formula

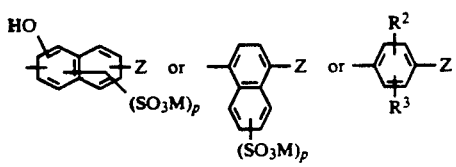

wherein
- $R^2$ is hydrogen, methyl, methoxy, chlorine, carboxy or sulfo,
- $R^3$ is hydrogen, methyl, methoxy, chlorine, carboxy, sulfo or acetylamino,
- p is zero, 1 or 2,
- M is hydrogen or an alkali metal, and
- Z is defined above.

5. A compound of the formula

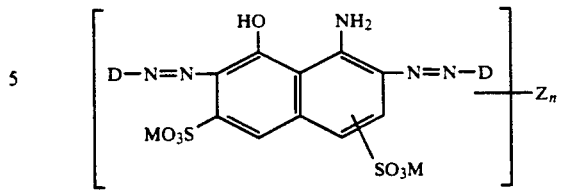

wherein n is the number 1, one of the group D is bonded with the group Z, and that D is a group of the formula

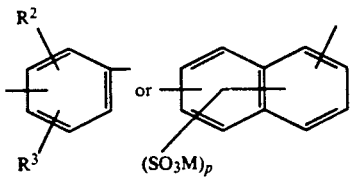

where
- p is zero, 1, or 2,
- M is hydrogen or an alkali metal
- $R^2$ is hydrogen, methyl, ethyl, methoxy, ethoxy, alkanoyl of 2 to 5 carbons, cyano, carboxy, sulfo, alkoxycarbonyl of 2 to 5 carbons, carbamoyl, N-($C_1$-$C_4$)-alkylcarbamoyl, fluorine, chlorine, bromine or trifluoromethyl and
- $R^3$ is hydrogen, methyl, ethyl, methoxy, ethoxy, cyano, carboxy, sulfo, alkyanoylamino of 2 to 5 carbons, alkoxycarbonyl of 2 to 5 carbons, carbamoyl, N-($C_1$-$C_4$-alkyl)-carbamoyl, fluorine, chlorine, nitro, sulfamoyl, N-($C_1$-$C_4$-alkyl)sulfamoyl, alkylsulfonyl of 1 to 4 carbons, phenylsulfonyl or phenoxy, and the other D to which Z is not bonded, is a group of the formula

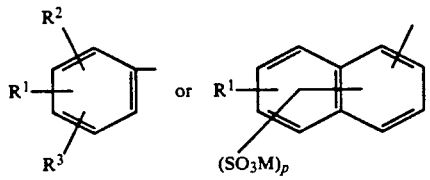

wherein
- $R^1$ is hydrogen, sulfo or a group of the formula —$SO_2$—Y, where Y is a vinyl or a group of the formula —$CH_2$—$CH_2$—X, in which X is a substituent which is eliminatable as an anion to form a vinyl group, and
- $R^2$ and $R^3$ are defined as above and
- p is zero, 1 or 2, and
- M is hydrogen or an alkali metal,
- Z is a group of the formula

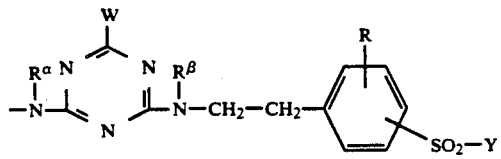

where $R^\alpha$ is hydrogen or alkyl of 1 to 4 carbon atoms,
$R^\beta$ is hydrogen or alkyl of 1 to 4 carbon atoms,
R is hydrogen or sulfo,
Y is defined as above,
W is hydroxy, N-morpholino, N-piperidinyl, N-pyrrolidinyl or a group of the formula (2)

$$-N\diagup^{G}_{\diagdown Q} \qquad (2)$$

where
G is hydrogen or alkyl of 1 to 6 carbon atoms and
Q is a group of the formula $$-(CH_2)_t-\!\!\!\!\bigcirc\!\!\!\!\begin{array}{c}R^a\\R^b\\R^c\end{array} \quad \text{or}$$

$$-(CH_2)_t-R^a$$

or $$-(CH_2)_t-O-(CH_2)_w-R^a \quad \text{or}$$

$$-(CH_2)_t-R^b$$

where
$R^a$ is a group of the formula —SO$_2$—Y, where Y is as defined above, or sulfo,
$R^b$ is hydrogen, alkoxy of 1 to 4 carbon atoms, sulfo, hydroxy, carboxy or chlorine,
$R^c$ is hydrogen, alkyl of 1 to 4 carbon atoms or alkoxy of 1 to 4 carbon atoms,
t is from 1 to 6, and
w is from 1 to 6, or
W is a group of the formula $$-A-(CH_2)_r-R^a$$

where
$R^a$ is as defined above,
r is zero, 1 or 2, and
A is a radical of the formula $$-N\diagup\diagdown N- \quad \text{or} \quad -N\diagup\diagdown \quad \text{or} \quad -N\diagup\diagdown \, ;$$

or wherein n is the number 2 and each Z is bonded to one of the two D's and both Z's are identical or different from one another and D is, independently of one another, a group of the formula $$\begin{array}{c}R^2\\ \bigcirc \\ R^3\end{array} \quad \text{or} \quad \bigcirc\!\!\!\bigcirc_{(SO_3M)_p}$$

6. A compound of the formula $$\left[\begin{array}{c} \text{Cu} \\ O \diagup\;\diagdown O \\ | \quad\nearrow\quad | \\ D-N=\!\!=\!\!N-K \end{array}\right]-Z_n$$

wherein
n is 1 and Z is bonded to D, and
the group Z-D- is a group of the formula $$Z-\!\!\!\!\bigcirc\!\!\!\!\begin{array}{c}R^2\\ \\R^3\end{array}$$

wherein
Z is a group of the formula $$-N\underset{\underset{N}{\|}}{\overset{R^\alpha\;N}{\diagdown}}\!\!\!\!\!\!\!\!\!\!\!\underset{\|}{\overset{W}{\|}}\!\!\!\!\!\!\!\!\!\!\!\overset{N\;R^\beta}{\diagup}\!\!N-CH_2-CH_2-\!\!\bigcirc\!\!\!\!\begin{array}{c}R\\SO_2-Y\end{array}$$

where
$R^\alpha$ is hydrogen or alkyl of 1 to 4 carbon atoms,
$R^\beta$ is hydrogen or alkyl of 1 to 4 carbon atoms,
R is hydrogen or sulfo,
Y is vinyl or a group of the formula —CH$_2$—CH$_2$—X, in which X is a substituent which is eliminatable as an anion to form a vinyl group,
W is hydroxy, N-morpholino, N-piperidinyl, N-pyrrolidinyl or a group of the formula (2)

$$-N\diagup^{G}_{\diagdown Q} \qquad (2)$$

where
G is hydrogen or alkyl of 1 to 6 carbon atoms and
Q is a group of the formula $$-(CH_2)_t-\!\!\!\!\bigcirc\!\!\!\!\begin{array}{c}R^a\\R^b\\R^c\end{array} \quad \text{or}$$

$$-(CH_2)_t-R^a$$

or $$-(CH_2)_t-O-(CH_2)_w-R^a$$

or $$-(CH_2)_t-R^b$$

where
- $R^a$ is a group of the formula $-SO_2-Y$, where Y is as defined above, or sulfo,
- $R^b$ is hydrogen, alkoxy of 1 to 4 carbon atoms, sulfo, hydroxy, carboxy or chlorine,
- $R^c$ is hydrogen, alkyl of 1 to 4 carbon atoms or alkoxy of 1 to 4 carbon atoms,
- t is from 1 to 6, and
- w is from 1 to 6, or
- W is a group of the formula

where
- $R^a$ is as defined above,
- r is zero, 1 to 2, and
- A is a radical of the formula

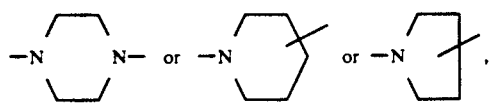

- $R^2$ is hydrogen, methyl, ethyl, methoxy, ethoxy, alkanoyl of 2 to 5 carbons, cyano, carboxy, sulfo, alkoxycarbonyl of 2 to 5 carbons, carbamoyl, N-($C_1$-$C_4$-alkyl)-carbamoyl, fluorine, chlorine, bromine or trifluoromethyl,
- $R^3$ is hydrogen, methyl, ethyl, methoxy, ethoxy, cyano, carboxy, sulfo, alkanoylamino of 2 to 5 carbons, alkoxycarbonyl of 2 to 5 carbons, carbonyl, N-($C_1$-$C_4$-alkyl)carbamoyl, fluorine, chlorine, nitro, sulfamoyl, N-($C_1$-$C_4$-alkyl)-sulfamoyl, alkylsulfonyl of 1 to 4 carbons, phenylsulfonyl or phenoxy, and
- K is a group of the formula

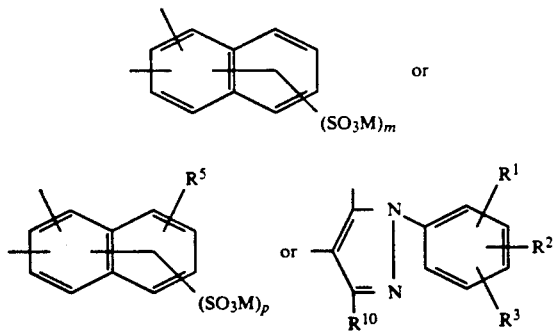

wherein
- $R^1$ is hydrogen, sulfo or a group of the formula $-SO_2-Y$, where Y is defined as above,
- $R^2$ and $R^3$ are defined as above,
- m is zero, 1, 2 or 3,
- p is zero, 1 or 2,
- M is hydrogen or an alkali metal,
- $R^5$ is alkylureido with an alkyl of 1 to 6 carbons, phenylureido, phenylureido substituted in the phenyl moiety by substituents selected from chlorine, methyl, ethyl, methoxy, nitro, sulfo and carboxy, or is alkanoylamino or 2 to 7 carbons, cyclohexanoylamino, benzoylamino or benzoylamino substituted in the benzene moiety by substituents selected from chlorine, methyl, methoxy, nitro, sulfo and carboxy, and

- $R^{10}$ is hydrogen, alkyl of 1 to 4 carbons, cyano, carboxy, carbalkoxy of 2 to 5 carbons, carbamoyl or phenyl, or wherein
- n is 1 and
- Z is bonded to K, and
- D is a group of the formula

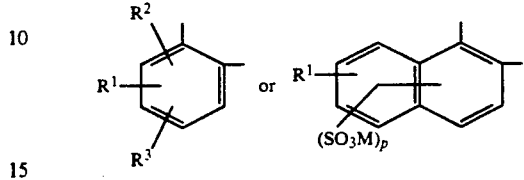

wherein
- $R^1$, $R^2$, $R^3$, M and p are defined as above, and the group -K-Z is of the formula

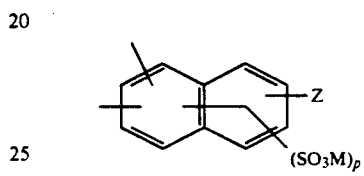

in which Z, M, and p are defined as above, or wherein n is 2 and one Z is bonded to D and the other Z is bonded to K and the group Z-D- is a group of the formula

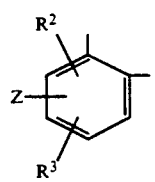

wherein Z, $R^2$ and $R^3$ are defined as above, and the group -K-Z is of the formula

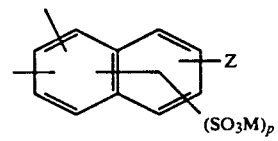

in which Z, M and p are defined as above.

7. A compound as claimed in claim 1, wherein $R^\alpha$ and $R^\beta$ are each hydrogen, Y is $\beta$-sulfatoethyl, and R is hydrogen.

8. A compound as claimed in claim 2, wherein $R^\alpha$ and $R^\beta$ are each hydrogen, Y is $\beta$-sulfatoethyl, and R is hydrogen.

9. A compound as claimed in claim 3, wherein $R^\alpha$ and $R^\beta$ are each hydrogen, Y is $\beta$-sulfatoethyl, and R is hydrogen.

10. A compound as claimed in claim 4, wherein $R^\alpha$ and $R^\beta$ are each hydrogen, Y is $\beta$-sulfatoethyl, and R is hydrogen.

11. A compound as claimed in claim 5, wherein $R^\alpha$ and $R^\beta$ are each hydrogen, Y is $\beta$-sulfatoethyl, and R is hydrogen.

12. A compound as claimed in claim 6, wherein $R^\alpha$ and $R^\beta$ are each hydrogen, Y is $\beta$-sulfatoethyl, and R is hydrogen.

* * * * *

UNITED STATES PATENT AND TRADEMARK OFFICE
CERTIFICATE OF CORRECTION

PATENT NO. : 5,128,455
DATED : July 7, 1992
INVENTOR(S) : Springer, et al

It is certified that error appears in the above-indentified patent and that said Letters Patent is hereby corrected as shown below:

The substituent $R^1$ of the formula column 62, in line 60, should read $R^a$.

In column 65, line 56, insert: a return and --$R^3$-- before the definition starting with "is hydrogen".

Signed and Sealed this

Twenty-first Day of December, 1993

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,128,455
DATED : July 7, 1992
INVENTOR(S) : Springer, et al

Page 2 of 2

It is certified that error appears in the above-indentified patent and that said Letters Patent is hereby corrected as shown below:

In column 67, lines 20-25 and lines 30-35, col. 68, delete

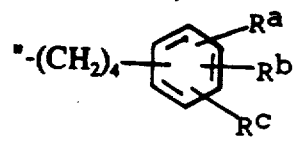

and insert: